United States Patent
Guan et al.

(10) Patent No.: US 9,591,509 B2
(45) Date of Patent: Mar. 7, 2017

(54) CONGESTION CONTROL SCHEME

(71) Applicant: QUALCOMM Incorporated, San Diego, CA (US)

(72) Inventors: Wei Guan, Bridgewater, NJ (US); Feng Ge, Highland Park, NJ (US); Vincent Douglas Park, Budd Lake, NJ (US); Junyi Li, Chester, NJ (US); Zhibin Wu, Bedminster, NJ (US); Hua Wang, Basking Ridge, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 155 days.

(21) Appl. No.: 14/250,031

(22) Filed: Apr. 10, 2014

(65) Prior Publication Data
US 2015/0296403 A1    Oct. 15, 2015

(51) Int. Cl.
*H04L 12/16*    (2006.01)
*H04W 28/02*    (2009.01)
(Continued)

(52) U.S. Cl.
CPC ......... *H04W 28/0215* (2013.01); *H04L 47/11* (2013.01); *H04W 4/005* (2013.01)

(58) Field of Classification Search
CPC .................................................. H04W 72/082
(Continued)

(56) References Cited

U.S. PATENT DOCUMENTS

2004/0160916 A1*  8/2004  Vukovic ............... H04L 1/0009
                                            370/332
2006/0292988 A1* 12/2006  Yuen .................... H04B 17/373
                                            455/62
(Continued)

FOREIGN PATENT DOCUMENTS

EP          1246415 A2    10/2002
WO      2006065896 A2     6/2006
(Continued)

OTHER PUBLICATIONS

Shin S.Y., et al., "Radio Resource Control Scheme for Machine-to-Machine Communication in LTE Infrastructure," 2012 International Conference on ICT Convergence (ICTC), 2012, pp. 1-6.
(Continued)

*Primary Examiner* — Shripal Khajuria
(74) *Attorney, Agent, or Firm* — Arent Fox LLP

(57) ABSTRACT

A method, an apparatus, and a computer program product for congestion control are provided. The apparatus measures respective signal qualities in at least two regions of a resource block, compares the respective signal qualities to each other, and determines a network congestion level based on the comparison. In an aspect, the apparatus may further decide whether to use resources respectively included in the at least two regions based on the network congestion level. Alternatively, the apparatus may further identify at least one MTC device or UE to refrain from using resources respectively included in the at least two regions when the network congestion level is above a threshold, and transmit a con-
(Continued)

gestion control signal to the at least one identified MTC device or identified UE when the network congestion level is above the threshold.

26 Claims, 20 Drawing Sheets

(51) Int. Cl.
*H04L 12/801* (2013.01)
*H04W 4/00* (2009.01)

(58) Field of Classification Search
USPC .......................................................... 370/235
See application file for complete search history.

(56) References Cited

U.S. PATENT DOCUMENTS

| | | | |
|---|---|---|---|
| 2012/0051216 A1 | 3/2012 | Zhang et al. | |
| 2012/0120818 A1 | 5/2012 | Lientz et al. | |
| 2012/0252458 A1 | 10/2012 | Ohnishi | |
| 2013/0148497 A1 | 6/2013 | Chan et al. | |
| 2013/0201823 A1 | 8/2013 | Gupta | |
| 2013/0225122 A1 | 8/2013 | Kahn et al. | |
| 2014/0022904 A1 | 1/2014 | Ahmad et al. | |
| 2014/0161016 A1* | 6/2014 | Morioka | H04L 1/1861 370/312 |
| 2014/0247781 A1 | 9/2014 | Somasundaram et al. | |

FOREIGN PATENT DOCUMENTS

| | | |
|---|---|---|
| WO | 2007010408 A2 | 1/2007 |
| WO | 2011100540 A1 | 8/2011 |

OTHER PUBLICATIONS

Yang F.M., et al., "Group-Based Control Method for Machine Type Communications in LTE System," 2013 Seventh International Conference on Complex, Intelligent, and Software Intensive Systems (CISIS), 2013, pp. 274-280.

Partial International Search Report—PCT/US2015/018863—ISA/EPO—Sep. 15, 2015.

International Search Report and Written Opinion—PCT/US2015/018863—ISA/EPO—Dec. 8, 2015.

\* cited by examiner

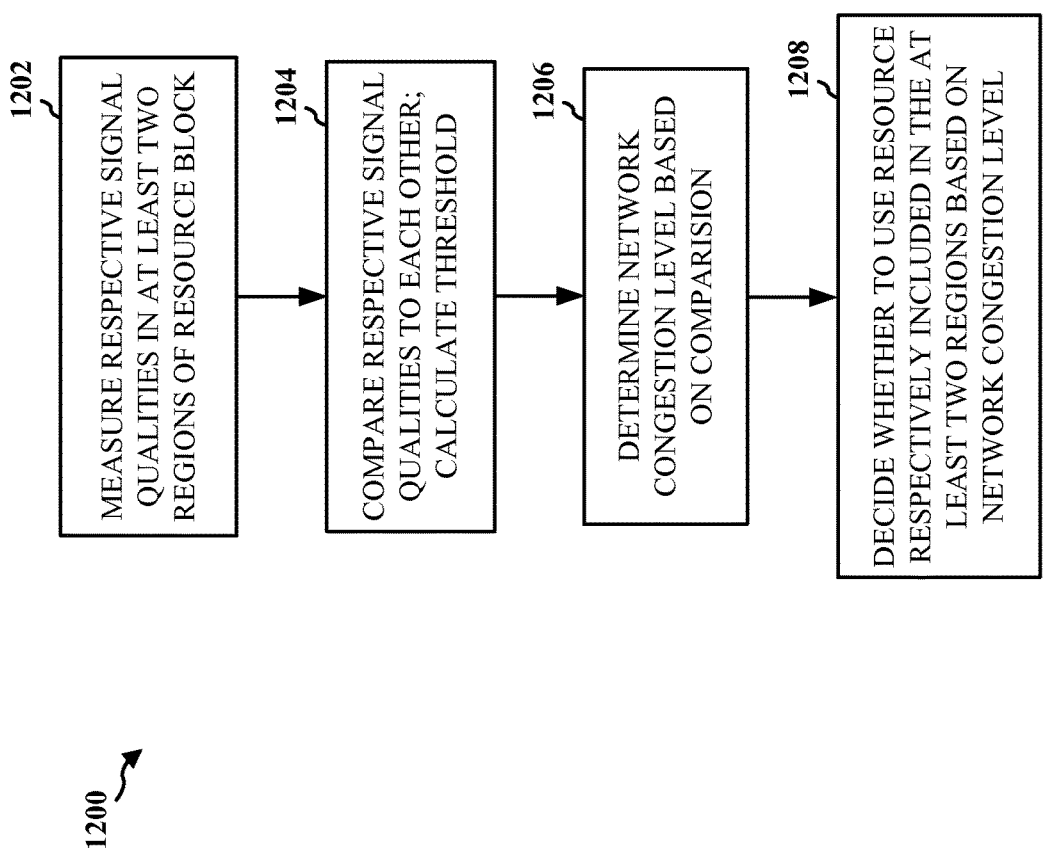

CONGESTION CONTROL SCHEME

BACKGROUND

Field

The present disclosure relates generally to communication systems, and more particularly, to controlling congestion among network devices.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a machine type communication (MTC) device and configured to measure respective signal qualities in at least two regions of a resource block, compare the respective signal qualities to each other, determine a network congestion level based on the comparison, and decide whether to use resources respectively included in the at least two regions based on the network congestion level.

In another aspect, the apparatus may be UE and configured to measure respective signal qualities in at least two regions of a resource block, compare the respective signal qualities to each other, determine a network congestion level based on the comparison, identify at least one machine type communication (MTC) device or other UE to refrain from using resources respectively included in the at least two regions when the network congestion level is above a threshold, and transmit a congestion control signal to the at least one identified MTC device or other identified UE when the network congestion level is above the threshold.

In a further aspect, the apparatus may be a base station and configured to receive at least one local congestion level respectively from at least one user equipment (UE), determine a network congestion level based on the at least one local congestion level, and transmit a congestion control signal to at least one of the at least one UE or at least one machine type communication (MTC) device based on the network congestion level.

BRIEF DESCRIPTION OF THE DRAWINGS

FIG. 12 is a flow chart of a method of congestion control.

DETAILED DESCRIPTION

Figure 1:
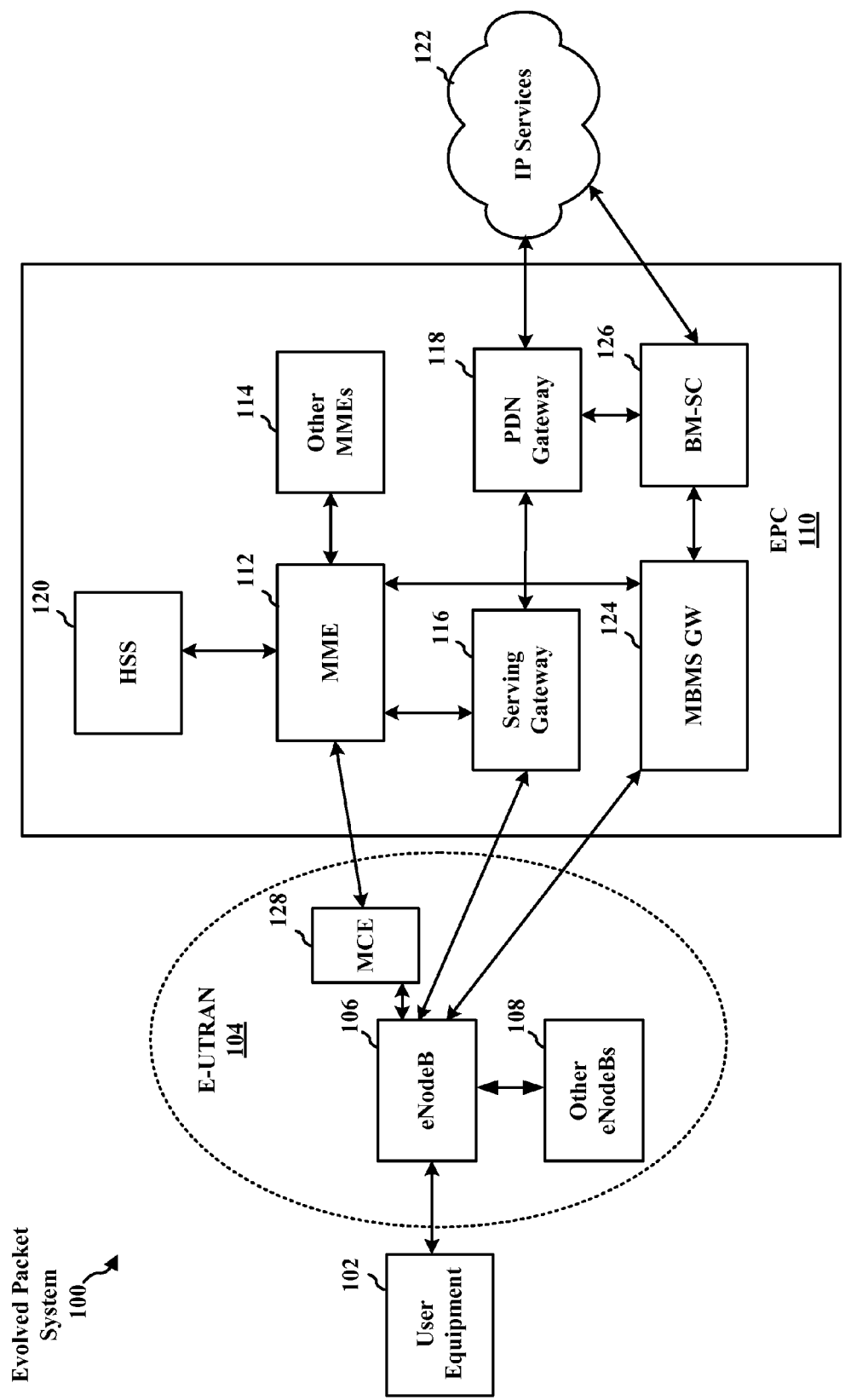
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
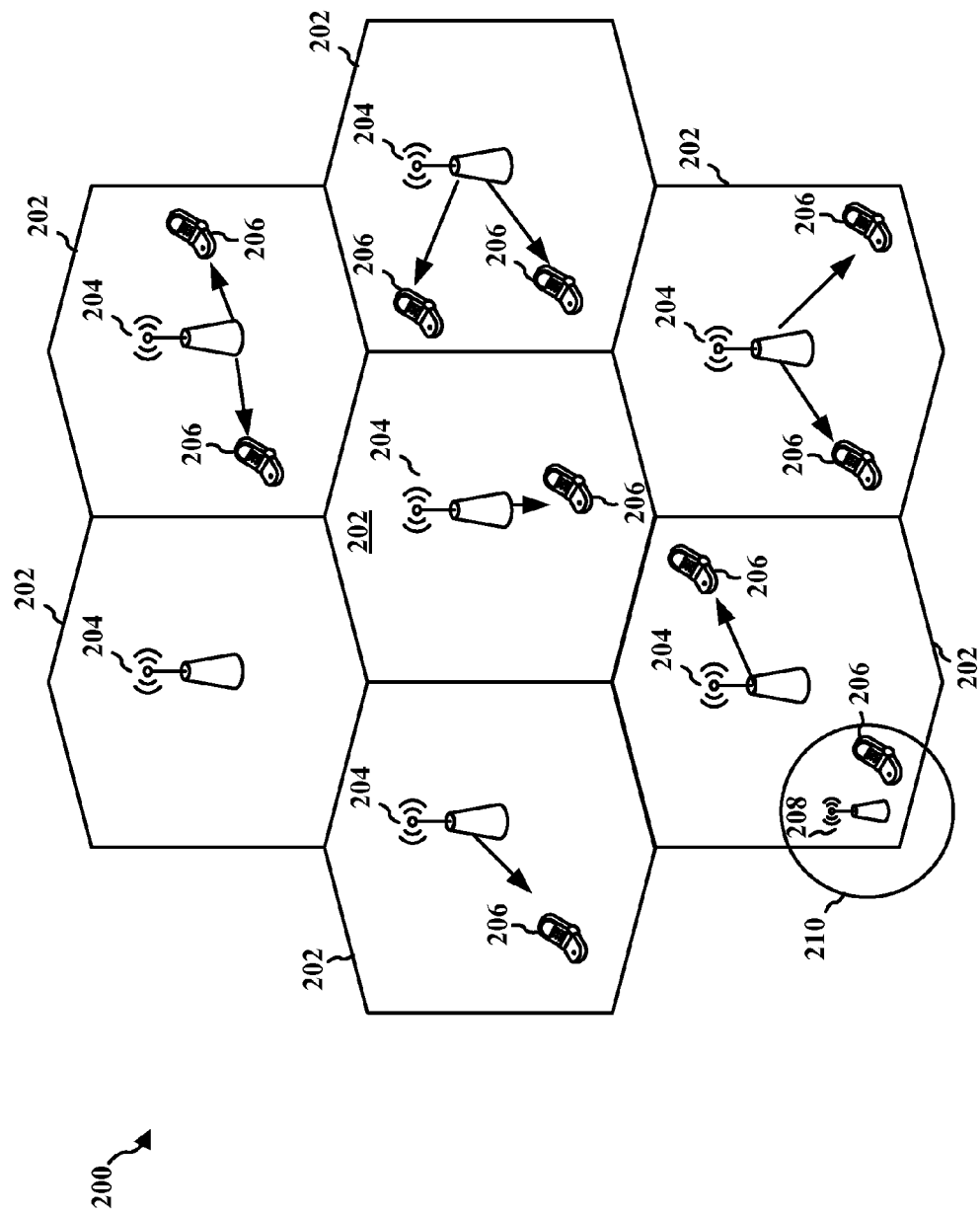
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
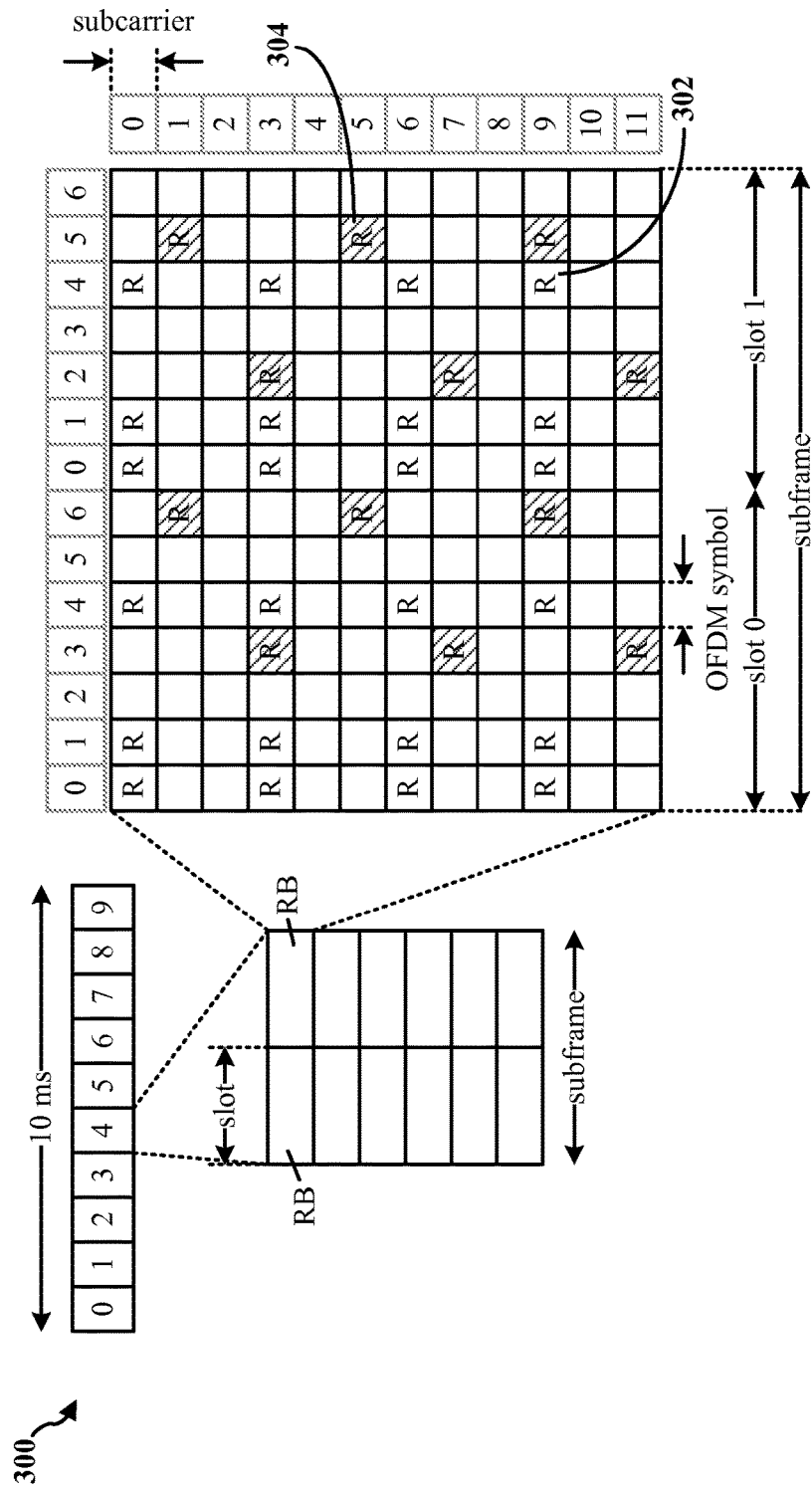
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
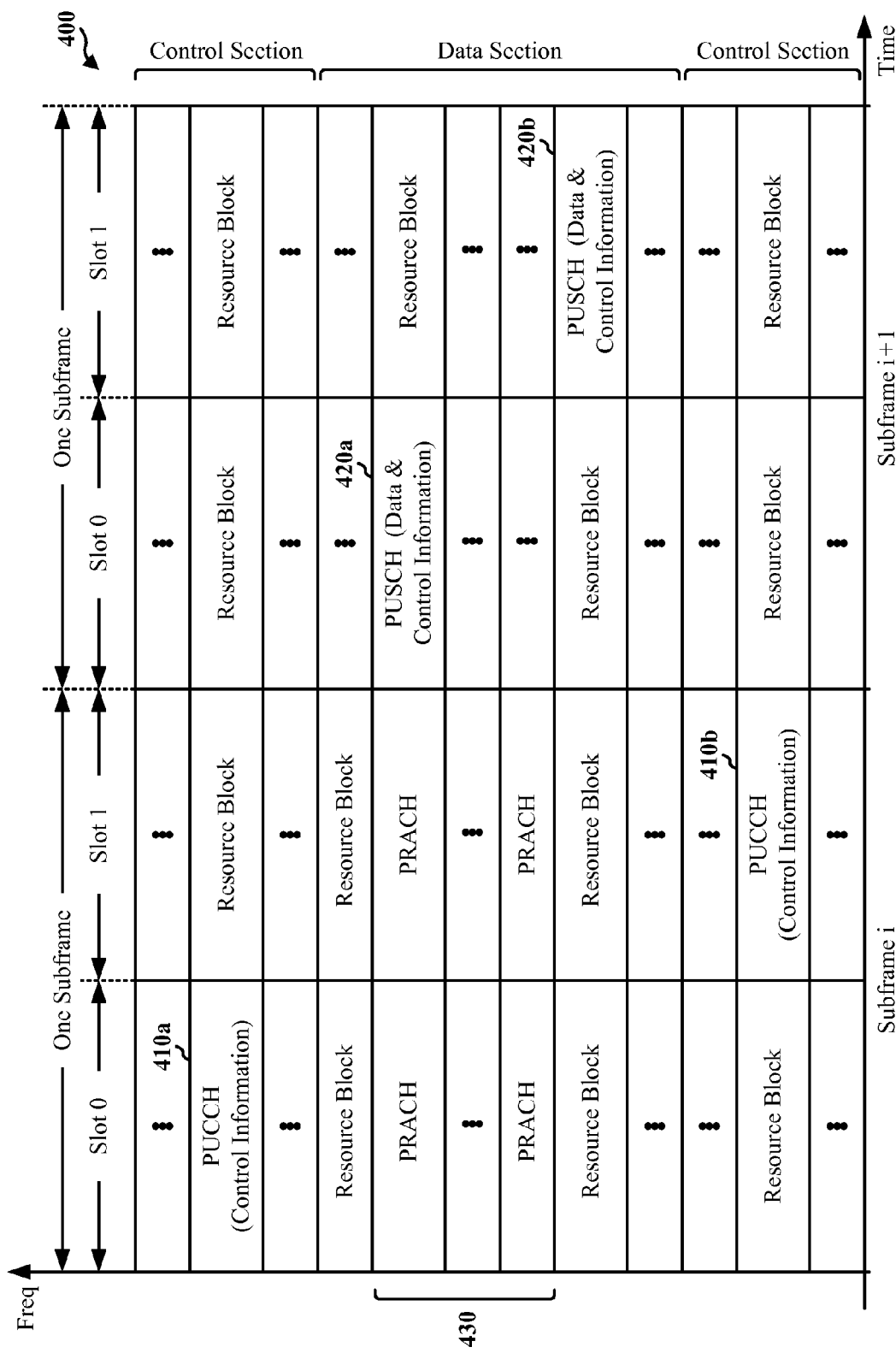
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
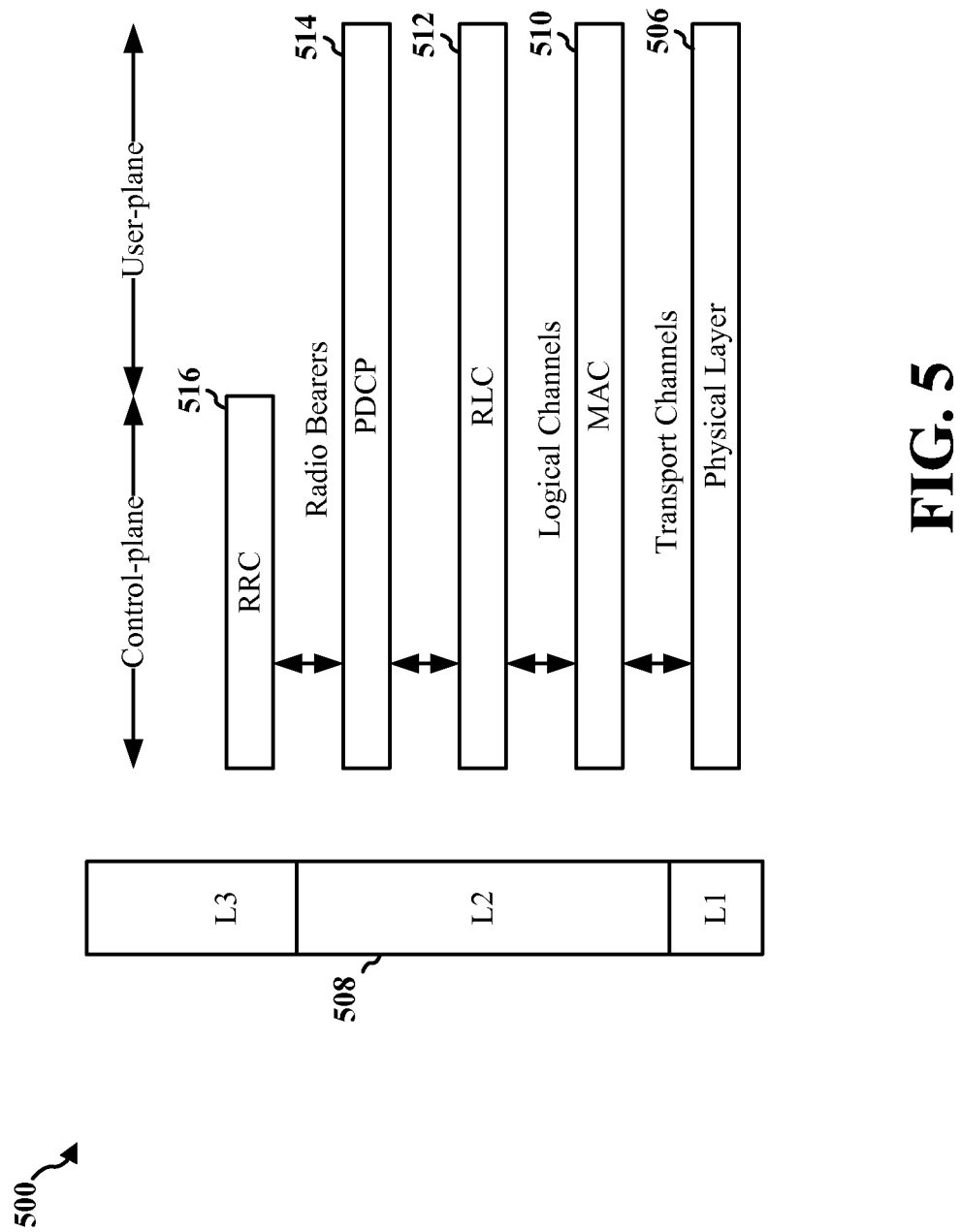
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
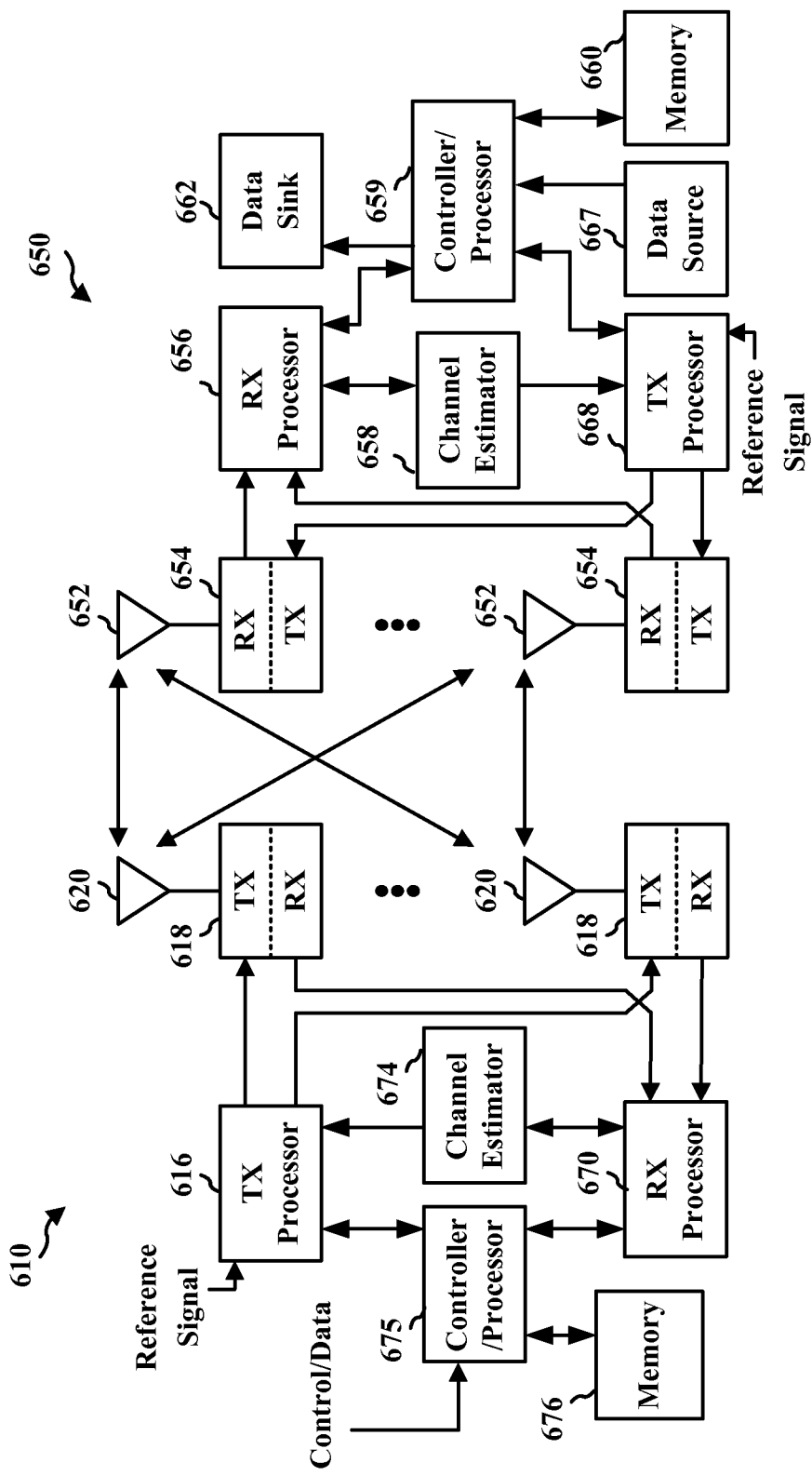
FIG. 6 is a diagram illustrating an example of an evolved Node B and user equipment in an access network.

FIG. 6 is a block diagram of an eNB 610 in communication with a UE 650 in an access network. The description below for the UE 650 may also apply to a machine type communication (MTC) device. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the DL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
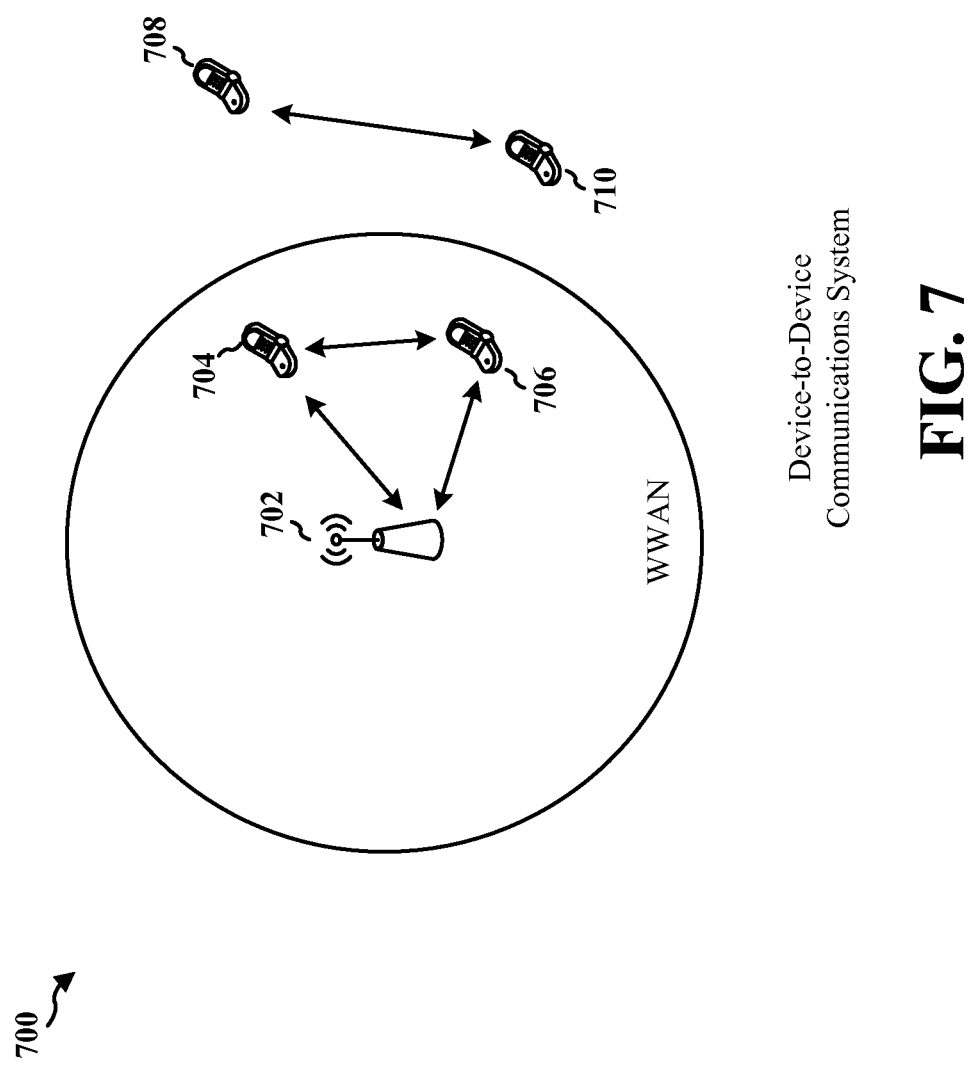
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

In an aspect, a wireless communication network may include a number of base stations that can support communication for a number of wireless devices. Wireless devices may comprise user equipments (UEs) and remote devices. A UE may be a device that operates under direct control by users. As stated above, some examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. A remote device may be a device that operates without being directly controlled by users. Some examples of remote devices include sensors, meters, monitors, location tags, etc. A remote device may communicate with a base station, another remote device, or some other entity. Machine type communication (MTC) refers to communication involving at least one remote device on at least one end of the communication.

Figure 8:
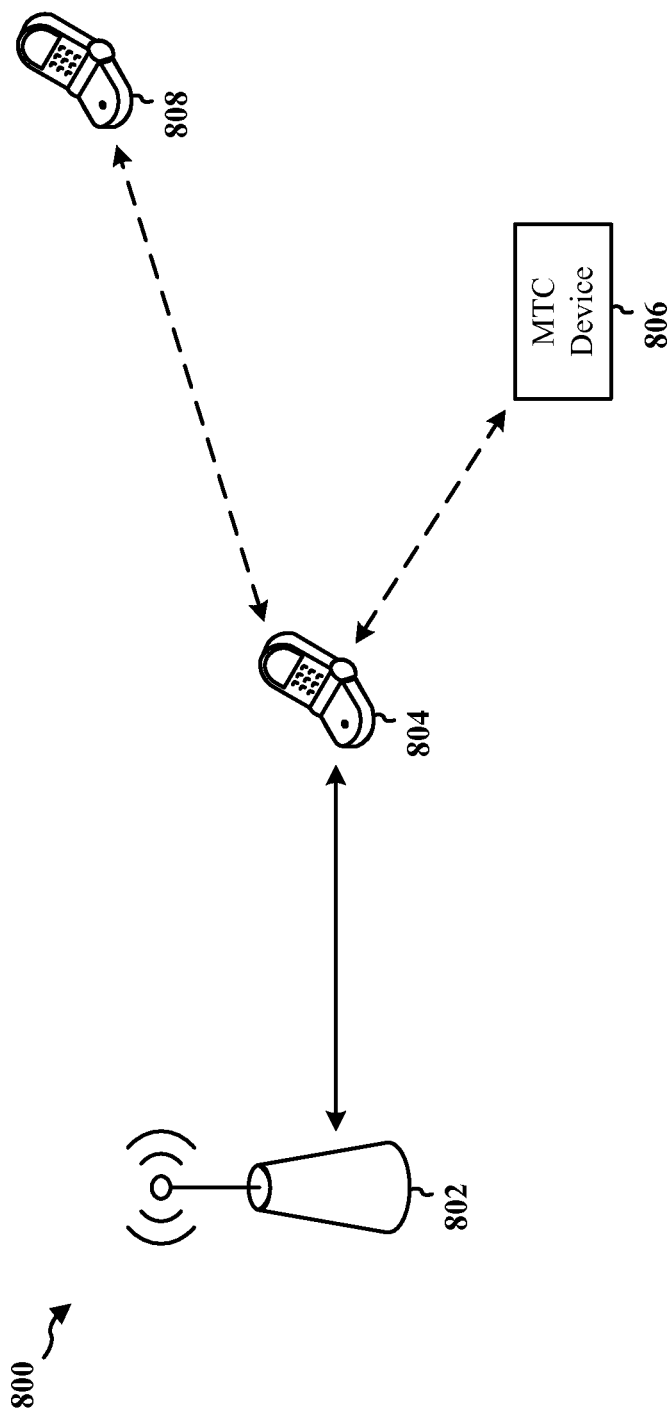
FIG. 8 is a diagram illustrating an example of machine type communication (MTC).

FIG. 8 is a diagram 800 illustrating an example of machine type communication (MTC). In a wireless communication system, such as LTE-Direct (LTE-D), devices (e.g., devices 704, 706, 708, and 710 in FIG. 7) can establish a communication link directly with other devices without involving an eNB. For such devices, peer discovery may be a first step before exchanging traffic data. Referring to FIG. 8, there may exist two types of devices capable of establishing the communication link without involving the eNB 802. A primary device may be a UE 804, which may discover as many peer UEs (e.g., UE 808) as possible to facilitate communication with the eNB 802. The UE 804 may operate at a high power and can thus establish both uplink and downlink communication with the eNB 802. A secondary device may be a MTC device 806, which may need to send data to the eNB 802. However, the MTC device 806 may not operate at a high power. For example, the MTC device 806 may only have a small power amplifier or have no power amplifier at all. Consequently, the MTC device 806 may be challenged by a link budget for uplink communications to the eNB 802.

In an aspect, a nearby UE (e.g., UE 804) may serve as an opportunistic relay station to assist the MTC device 806 in uplink communications. Consequently, the UE 806 may discover both a peer UE (e.g., UE 808) and the MTC device 806 located nearby, wherein discovery of the peer UE 808 may have a higher priority. The MTC device 806 may not need to discover other MTC devices. Moreover, the MTC device 806 may not need to discover more than one UE when the MTC device 806 can rely on one nearby UE (e.g., UE 804) to relay data to the eNB 802.

Figure 9:
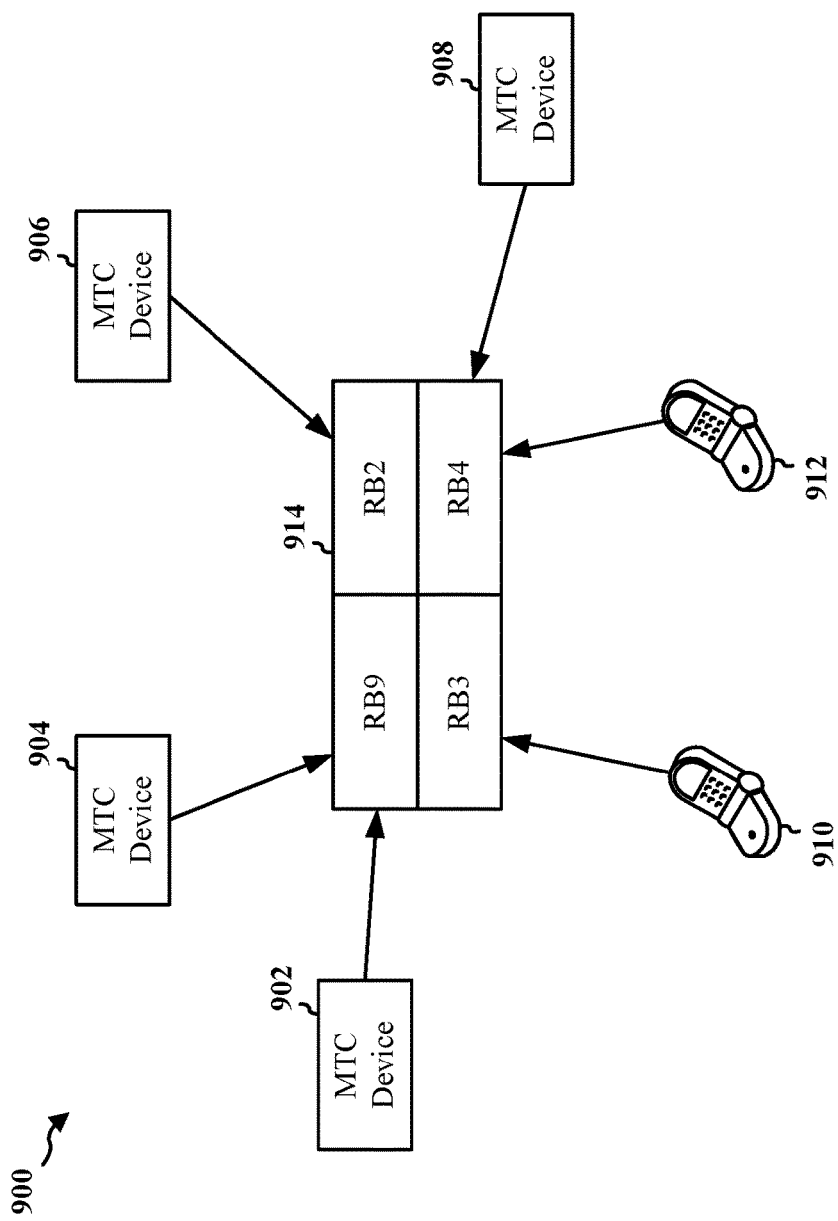
FIG. 9 is a diagram illustrating an example of network congestion.

FIG. 9 is a diagram 900 illustrating an example of network congestion. For peer discovery, devices (e.g., UEs 910, 912 and MTC devices 902, 904, 906, 908) may send peer discovery signals on common peer discovery channels. The peer discovery channels may be organized as a two-dimensional grid 914. The grid 914 may include a number of Resource Blocks (RBs), e.g., RB1, RB2, RB3, and RB4. Each device may utilize an RB to send peer discovery signals. However, signal collision may occur when multiple devices send their respective peer discovery signals on the same RB. For example, in FIG. 9, MTC device 902 and MTC device 904 use the same RB (RB1) to send their respective peer discovery signals. In another example, MTC device 908 and UE 912 use the same RB (RB4) to send their respective peer discovery signals. In an aspect, colliding signals become co-channel interference with respect to each other such that devices are prevented from being discovered. When the network is congested locally (e.g., the number of devices in a small region is larger than a total number of RBs), collision may be inevitable. When congestion is at its worst, numerous collisions are present on all RBs of the grid 914, thus preventing discovery of any devices utilizing the grid 914. Accordingly, congestion control may be implemented to provide a well-organized method of using the common peer discovery channels to avoid collisions.

Figure 10:
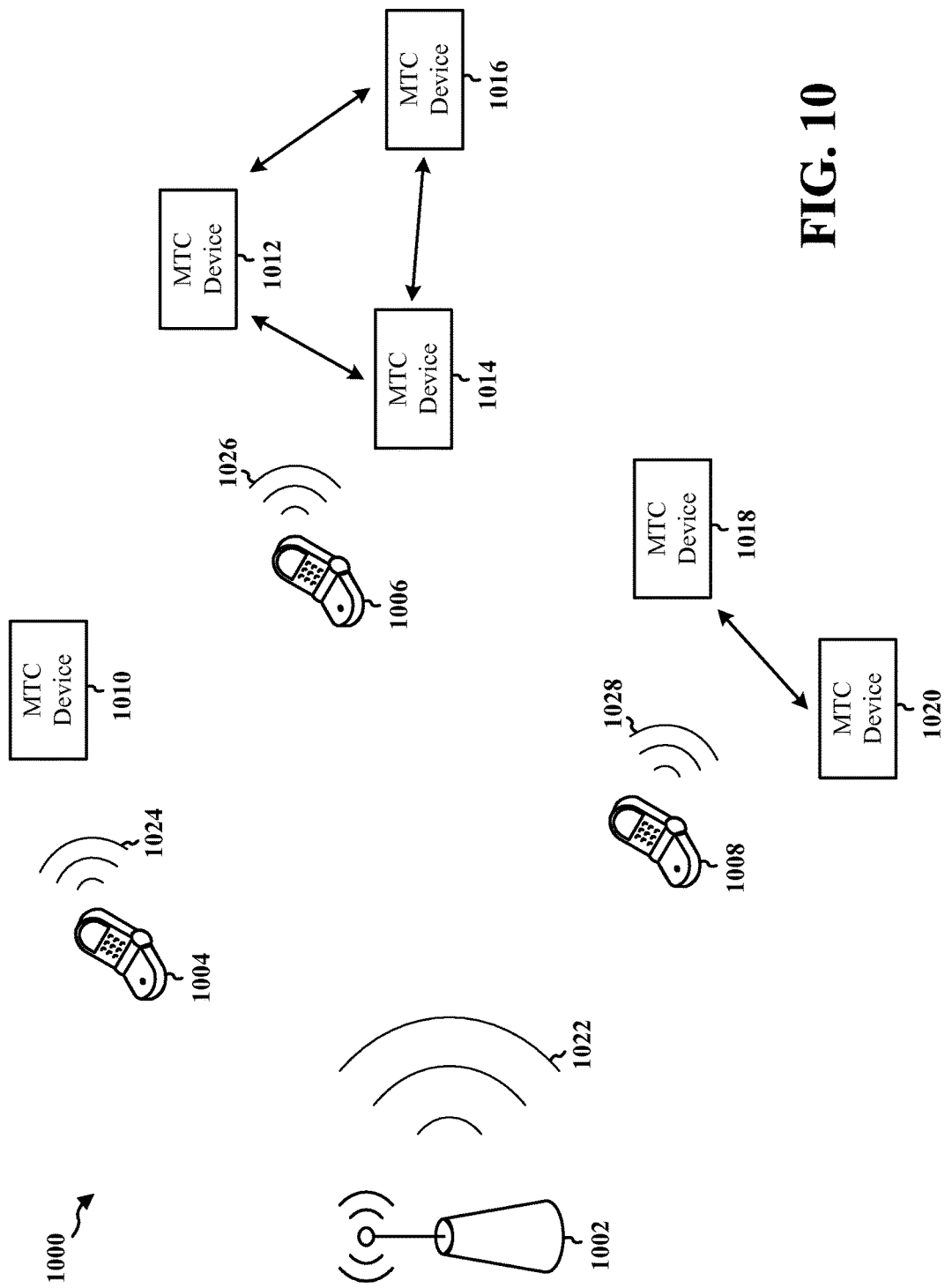
FIG. 10 is a diagram illustrating network congestion control.

FIG. 10 is a diagram 1000 illustrating network congestion control. Network congestion may occur when a large number of MTC devices (e.g., MTC devices 1010, 1012, 1014, 1016, 1018, 1020) simultaneously access a limited amount of resources. To mitigate/control congestion, the MTC devices may be instructed to backoff from using the resources for a period of time when necessary. By enforcing MTC device backoff, the chance of simultaneous access to the same channel resource during a time period may be greatly reduced. Additionally or alternatively, an entire channel resource may be divided into different operating regions to mitigate/control congestion. By doing so, the presence of a large number of MTC devices in the network would not greatly reduce the peer discovery performance of the UE. In an aspect, an MTC, UE, and/or eNB may manage congestion control. For example, the eNB 1002 may transmit signals 1022 to the UEs and/or MTC devices to control congestion. In another example, the UEs may transmit signals to the MTC devices to control congestion. As shown in FIG. 10, the UE 1004 may transmit congestion control signals 1024 to the MTC device 1010, the UE 1006 may transmit congestion control signals to the MTC devices 1012, 1014, 1016, and the UE 1008 may transmit congestion control signals to the MTC devices 1018, 1020. In a further example, the MTC devices may monitor network congestion and determine how to control congestion autonomously.

Figure 11A:
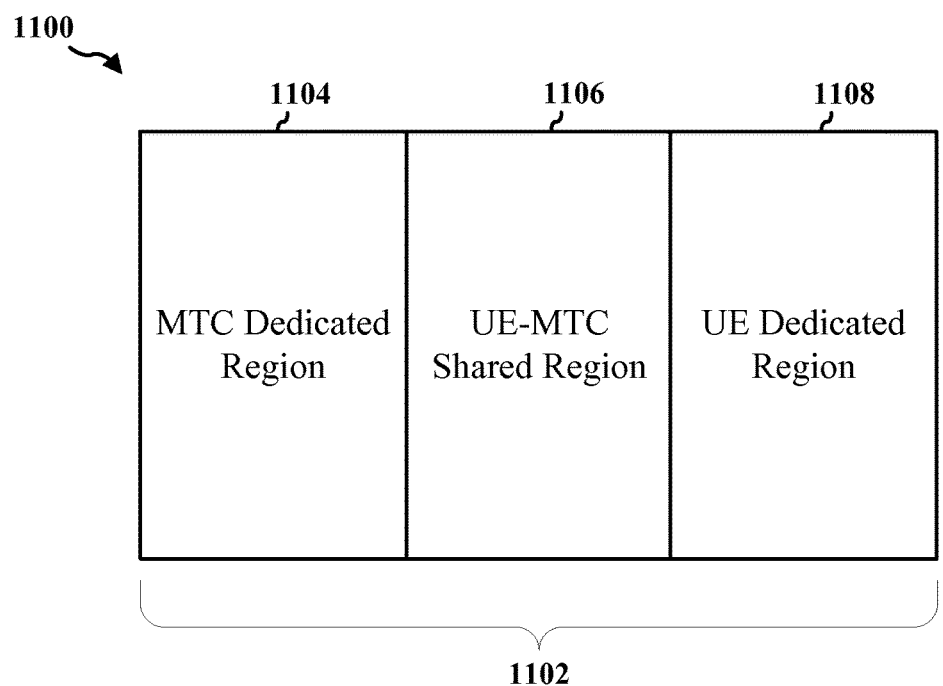
FIG. 11A is a diagram illustrating resource partitioning.
Figure 11B:
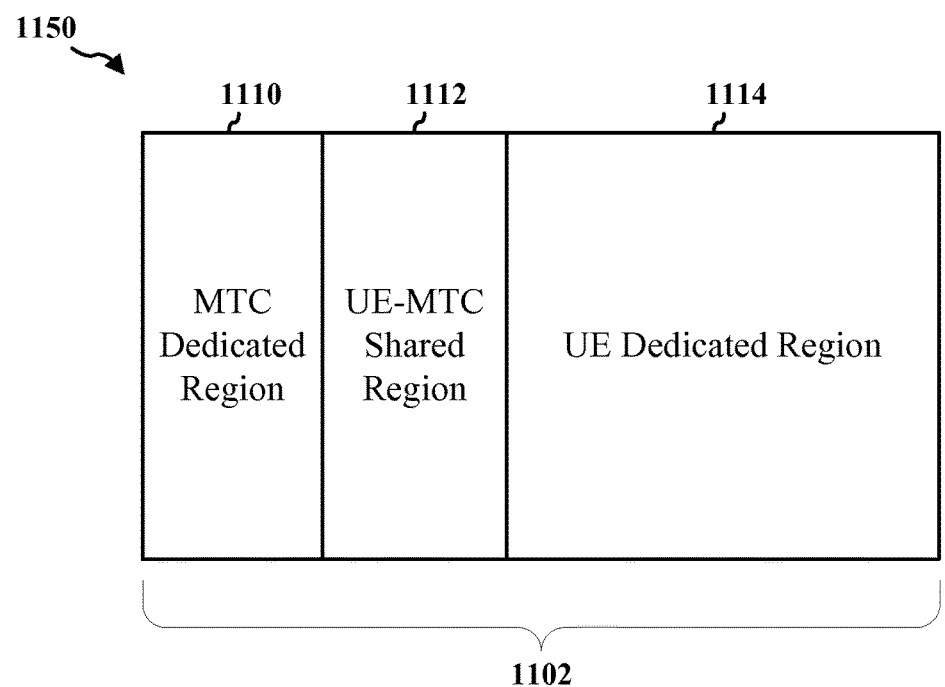
FIG. 11B is a diagram illustrating re-allocated resource portioning.

FIG. 11A is a diagram 1100 illustrating resource partitioning. FIG. 11B is a diagram 1150 illustrating re-allocated resource portioning. For LTE-D peer discovery, channel resources may be organized as a two-dimensional resource block (RB) 1102. Signal collisions may occur when multiple devices simultaneously send their respective peer discovery signals on the same RB, and therefore, none of the signals may be discovered.

Referring to FIG. 11A, network congestion may be mitigated by partitioning/dividing the entire resource block 1102 into shared and dedicated regions. An MTC dedicated region 1104 may be a region allocated for use by an MTC device (i.e., no UEs). A UE dedicated region 1108 may be a region allocated for use by a UE (i.e., no MTC devices). A UE-MTC shared region 1106 may be a region allocated for use by both the UE and the MTC device. In an aspect, the resource block partitioning may be made in the logical domain or the physical domain. In a further aspect, resource block partitioning may be decided autonomously by the MTC device, or controlled by the UE or eNB.

In an aspect, network congestion may be mitigated by facilitating the MTC device to backoff (restrict use of resources) for a period of time. A decision to backoff may depend on signal quality measurements on the resource block 1102, specifically in the MTC dedicated region 1104, the UE dedicated region 1108, and the UE-MTC shared region 1106, respectively, and comparing the signal quality measurements to each other. A signal quality measured may include signal power, signal-to-noise ratio, and number of discovered UEs/MTC devices, for example. Similar to resource block partitioning, the decision to backoff may be made autonomously by the MTC device, or controlled by the UE or eNB.

In an aspect, the MTC device may autonomously decide to launch/manage congestion control. To manage congestion control, the MTC device may monitor a local (nearby) network congestion level to decide whether a network is congested. The congestion level may be estimated by measuring signal qualities on the resource block 1102 in the MTC dedicated region 1104, the UE dedicated region 1108, and the UE-MTC shared region 1106, respectively, and comparing the measured signal qualities to each other. For example, if an average signal power on the resource block 1102 in the UE-MTC shared region 1106 is significantly larger than an average signal power on the resource block 1102 in the UE dedicated region 1108, then the network may be congested and an autonomous congestion control mechanism at the MTC device may be triggered.

When the congestion control mechanism is triggered, the MTC device may perform various operations to mitigate congestion control. For example, the MTC device may choose to backoff (restrict use of resources) for a period of time (e.g., during a backoff window) until the network is no longer congested. When backing off, the MTC device may restrict use of the resource block 1102 to the MTC dedicated region 1104. Additionally or alternatively, the MTC device may restrict use of the resource block 1102 by lowering a preference to use the UE-MTC shared region 1106 and using the UE-MTC shared region 1106 based on the lowered preference. During the backoff window, the MTC device may enter a sleep mode or continue monitoring the local network congestion level. When the backoff window ends, the MTC device may again decide whether to launch/manage congestion control based on the operations describe above.

In an aspect, the UE may also monitor the local network congestion level and manage surrounding MTC devices/UEs to mitigate network congestion. Similar to the MTC device, the UE may detect/determine whether the network is congested by measuring signal qualities on the resource block 1102 in the MTC dedicated region 1104, the UE dedicated region 1108, and the UE-MTC shared region 1106, respectively, and comparing the measured signal qualities to each other. For example, if the average signal power on the resource block 1102 in the UE-MTC shared region 1106 is significantly larger than the average signal power on the resource block 1102 in the UE dedicated region 1108, then the network may be congested.

When network congestion is detected, the UE may broadcast a congestion control signal (e.g., signals 1024, 1026, and 1028 in FIG. 10) to the surrounding MTC devices/UEs to prompt the MTC devices/UEs to perform an action for mitigating congestion. The congestion control signal may include a threshold for determining network congestion, a network congestion level, an amount of requested backoff (e.g., access probability or a requested amount of time to refrain from using the MTC dedicated region, the UE dedicated region, and/or the UE-MTC shared region of the resource block 1102), a MTC device identifier, a UE identifier, and/or an identifier of a group of MTC devices/UEs that should perform an action to mitigate congestion. Referring to FIG. 11B, the UE may also re-partition/re-allocate the resources of the resource block 1102 into a re-allocated MTC dedicated region 1110, a re-allocated UE dedicated region 1114, and a re-allocated UE-MTC shared region 1112. The resource partitioning information may also be included in the congestion control signal. After receiving the congestion control signal, the MTC device may be restricted to use an allocated channel resource, and therefore backoff from using such resource for an amount of time requested in the congestion control signal. Alternatively, the MTC device may autonomously determine the amount of backoff time according to the congestion level.

In an aspect, the eNB may assist congestion control for the entire network. UEs may periodically report a local congestion level to the eNB. A UE may also report other information such as peer discovery performance and/or an identifier of a group of surrounding MTC devices/UEs that the UE wishes to backoff. According to the reported information, the eNB may re-partition/re-allocate the resources of the resource block 1102 into the re-allocated MTC dedicated region 1110, the re-allocated UE dedicated region 1114, and the re-allocated UE-MTC shared region 1112. The eNB may specify a threshold (reshuffle threshold) for the UEs in the network indicating when to switch resources to use in the resource block 1102. The eNB may also specify an amount of backoff time for a group of MTC devices/UEs in the network.

The eNB may broadcast a network-wide congestion control signal (e.g., signal 1022 in FIG. 10) to all UEs and MTC devices in the network. The congestion control signal may include a threshold for determining network congestion, a local congestion level, a network congestion level, resource partitioning information, a reshuffle threshold for the UE, an amount of requested backoff (e.g., access probability or a requested amount of time to refrain from using the MTC dedicated region, the UE dedicated region, and/or the UE-MTC shared region of the resource block 1102), a MTC identifier, a UE identifier, and/or an identifier of a group of target MTC devices/UEs that should perform an action to mitigate congestion. After receiving the congestion control signal, the target MTC devices/UEs of the network may be restricted to use an allocated channel resource, and therefore backoff from using such resource for an amount of time requested in the congestion control signal. Alternatively, the MTC devices/UEs may autonomously determine the amount of backoff time according to the congestion level. The UEs may further switch resources to use in the resource block 1102 according to the reshuffle threshold included in the congestion control signal.

In an aspect, a communication network may include three types of devices: a central controller node (CCN), a persistent access device (PAD), and a temporarily random access device (TRAD). In an aspect, an example of the CCN is the eNB, an example of the PAD is the UE, and an example of the TRAD is the MTC device. The CCN may act a central controller of the network. The PAD may be a high-power device capable of both uplink and downlink connections with the CCN. The TRAD may be a low-power device capable of a downlink connection, but not an uplink connection, with the CCN. The PAD and TRAD may be capable of connection with other surrounding PADs and TRADs. The PAD and TRAD may send peer discovery signals on common peer discovery channels, wherein all surrounding PADs and TRADs may decode such peer discovery signals. A peer discovery resource (e.g., resource block) may be divided/partitioned into a PAD dedicated region that can be used by the PAD alone, a TRAD dedicated region that can be used by the TRAD alone, and a PAD-TRAD shared region that can be used by both the PAD and TRAD. The resource partitioning may be made in the logical domain or in the physical domain. Congestion control allows the PAD and TRAD to properly use a common channel to avoid signal collision, such that each PAD can discover as many surrounding PADs and TRADs as possible.

FIG. 12 is a flow chart 1200 of a method of congestion control. The method may be performed by a MTC device. At step 1202, the MTC device measures respective signal qualities in at least two regions of a resource block (e.g., resource block 1102). Measuring the respective signal qualities may include measuring a first signal quality in a first region of the resource block, a second signal quality in a second region of the resource block, and a third signal quality in a third region of the resource block. In an aspect, the first region includes first resources allocated for at least one MTC device (e.g., MTC dedicated region 1104), the second region includes second resources allocated for the at least one MTC device and at least one UE (e.g., UE-MTC shared region 1106), and the third region includes third resources allocated for the at least one UE (e.g., UE dedicated region 1108). In an aspect, the first signal quality, the second signal quality, or the third signal quality may be a signal power, a signal-to-noise ratio, a number of discovered MTC devices or UEs, a number of resources being used, and/or a number of resources on which a UE or a MTC can be discovered.

At step 1204, the MTC device compares the respective signal qualities to each other. The MTC device may further calculate a threshold related to a network congestion level based on the measured signal qualities. At step 1206, the MTC device determines the network congestion level based on the comparison.

At step 1208, the MTC device decides whether to use the resources respectively included in the at least two regions based on the network congestion level. In an aspect, the MTC device decides whether to use at least one of the first resources of the first region or the second resources of the second region based on the network congestion level.

In a further aspect, the MTC device decides by refraining from using at least one of the first resources of the first region or the second resources of the second region for a period of time when the network congestion level is above the threshold. During the period of time, the MTC device may activate a sleep mode. Alternatively, during the period of time, the MTC device may continue to measure the first signal quality, the second signal quality, and the third signal quality, compare the first signal quality, the second signal quality, and the third signal quality to each other, and determine the network congestion level based on the comparison.

In another aspect, the MTC device decides by restricting use of the resource block to the first resources of the first region when the network congestion level is above the threshold. In yet another aspect, when the network congestion level is above the threshold, the MTC device decides by lowering a preference to use the second resources of the second region and using the second resources of the second region based on the lowered preference.

Figure 13:
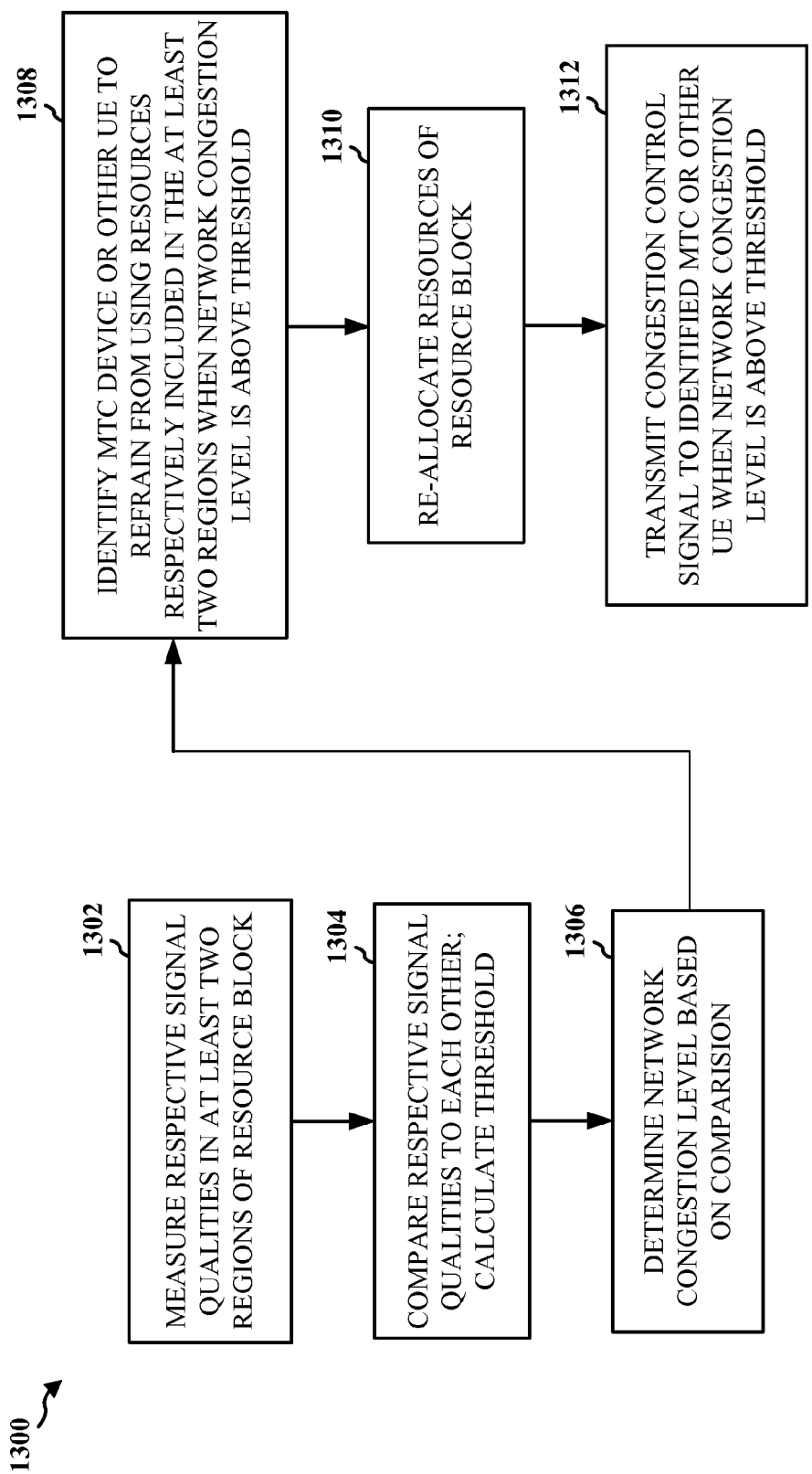
FIG. 13 is a flow chart of a method of congestion control.

FIG. 13 is a flow chart 1300 of a method of congestion control. The method may be performed by a UE. At step 1302, the UE may measure respective signal qualities in at least two regions of a resource block (e.g., resource block 1102). Measuring the respective signal qualities may include measuring a first signal quality in a first region of the resource block, a second signal quality in a second region of the resource block, and a third signal quality in a third region of the resource block. In an aspect, the first region includes first resources allocated for at least one MTC device (e.g., MTC dedicated region 1104), the second region includes second resources allocated for the at least one MTC device and at least one UE (UE-MTC shared region 1106), and the third region includes third resources allocated for the at least one UE (UE dedicated region 1108). In an aspect, the first signal quality, the second signal quality, or the third signal quality may be a signal power, a signal-to-noise ratio, a number of discovered MTC devices or UEs, a number of resources being used, and/or a number of resources on which a UE or a MTC device can be discovered.

At step 1304, the UE compares the respective signal qualities to each other. The UE may further calculate a threshold related to a network congestion level based on the measured signal qualities. At step 1306, the UE determines a network congestion level based on the comparison.

At step 1308, the UE identifies at least one MTC device or other UE to refrain from using resources respectively included in the at least two regions when the network congestion level is above the threshold. In an aspect, the UE identifies by identifying the at least one MTC device or the other UE to refrain from using at least one of the first resources, the second resources, or the third resources when the network congestion level is above the threshold.

At step 1310, the UE re-allocates the first resources, the second resources, and the third resources of the resource block based on the network congestion level. The re-allocating may include dividing the resource block into a re-allocated first region, a re-allocated second region, and a re-allocated third region. The re-allocated first region may include re-allocated first resources for the at least one MTC device (e.g., re-allocated MTC dedicated region 1110). The re-allocated second region may include re-allocated second resources for the at least one MTC device and the at least one UE (e.g., re-allocated UE-MTC shared region 1112). The re-allocated third region may include re-allocated third resources for the at least one UE (e.g., re-allocated UE dedicated region 1114).

At step 1312, the UE transmits a congestion control signal to the at least one identified MTC device or other identified UE when the network congestion level is above the threshold. The congestion control signal may include a threshold for determining network congestion, the network congestion level, a requested amount of time to refrain from using the at least one of the first resources, the second resources, or the third resources, a MTC device identifier, a UE identifier, and/or resource allocation information.

Figure 14:
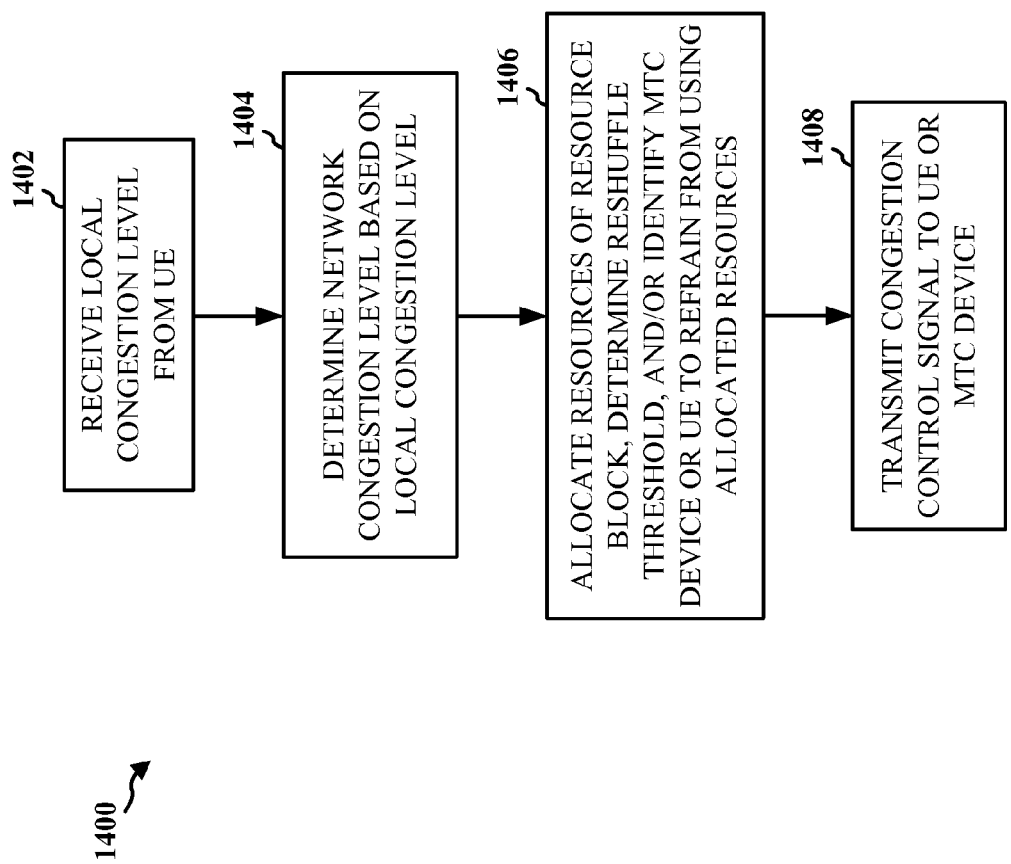
FIG. 14 is a flow chart of a method of congestion control.

FIG. 14 is a flow chart 1400 of a method of congestion control. The method may be performed by a base station (e.g., eNB). At step 1402, the base station receives at least one local congestion level respectively from at least one UE. At step 1404, the base station determines a network congestion level based on the at least one local congestion level.

At step 1406, based on the at least one local congestion level or the network congestion level, the base station may perform one or more actions. For example, the base station may allocate resources of a resource block (e.g., resource block 1102) into a first region, a second region, and a third region, wherein the first region includes first resources allocated for at least one MTC device (e.g., MTC dedicated region 1104), the second region includes second resources allocated for the at least one MTC device and the at least one UE (e.g., UE-MTC shared region 1106), and the third region includes third resources allocated for the at least one UE (e.g., UE dedicated region 1108). In another example, the base station may determine a reshuffle threshold for the at least one UE. In a further example, the base station may identify at least one MTC device or UE to refrain from using at least one of the first resources, the second resources, or the third resources.

At step 1408, the base station transmits a congestion control signal to the at least one UE and/or the at least one MTC device based on the network congestion level. The congestion control signal may include a threshold for determining network congestion, the at least one local congestion level, the network congestion level, the resource allocation of the resource block, the reshuffle threshold for the at least one UE, a requested amount of time to refrain from using the at least one of the first resources, the second resources, or the third resources, a MTC device identifier, and/or a UE identifier.

Figure 15:
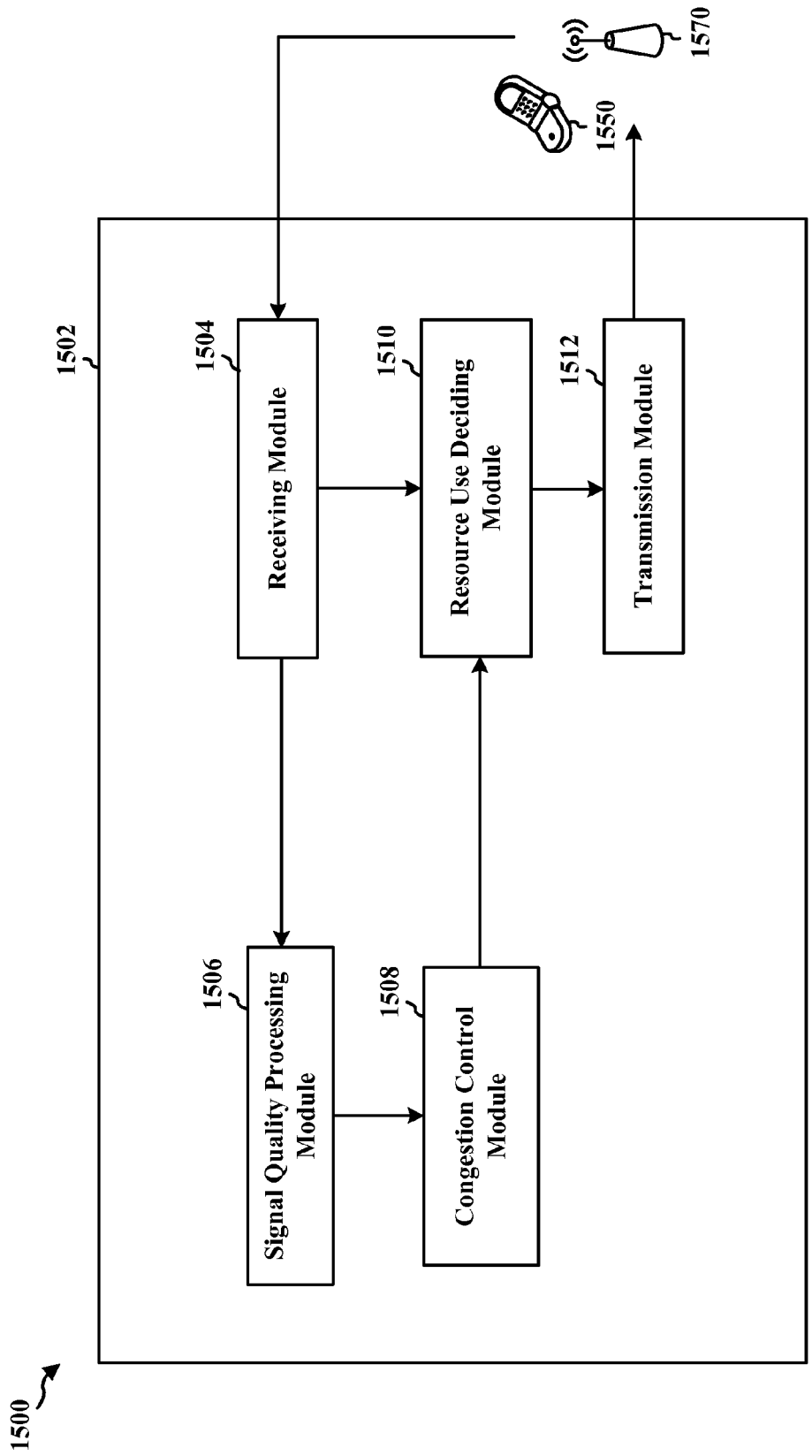
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a MTC device communicating signals with a UE 1550 and/or receiving signals from a base station 1570. The apparatus includes a receiving module 1504, a signal quality processing module 1506, a congestion control module 1508, a resource use deciding module 1510, and a transmission module 1512.

The signal quality processing module 1506 measures respective signal qualities (of signals received via the receiving module 1504) in at least two regions of a resource block (e.g., resource block 1102). Measuring the respective signal qualities may include measuring a first signal quality in a first region of the resource block, a second signal quality in a second region of the resource block, and a third signal quality in a third region of the resource block. In an aspect, the first region includes first resources allocated for at least one MTC device (e.g., MTC dedicated region 1104), the second region includes second resources allocated for the at least one MTC device and at least one UE (e.g., UE-MTC shared region 1106), and the third region includes third resources allocated for the at least one UE (e.g., UE dedicated region 1108). In an aspect, the first signal quality, the second signal quality, or the third signal quality may be a signal power, a signal-to-noise ratio, a number of discovered MTC devices or UEs, a number of resources being used, and/or a number of resources on which a UE or a MTC can be discovered.

The congestion control module 1508 compares the respective signal qualities to each other. The congestion control module 1508 may also calculate a threshold related to a network congestion level based on the measured signal qualities. The congestion control module 1508 further determines the network congestion level based on the comparison.

The resource use deciding module 1510 decides whether to use the resources respectively included in the at least two regions based on the network congestion level. In an aspect, the resource use deciding module 1510 decides whether to use at least one of the first resources of the first region or the second resources of the second region based on the network congestion level.

In a further aspect, the resource use deciding module 1510 decides by refraining from using at least one of the first resources of the first region or the second resources of the second region for a period of time when the network congestion level is above the threshold. During the period of time, the congestion control module 1508 may activate a sleep mode. Alternatively, during the period of time, the signal quality processing module 1506 may continue to measure the first signal quality, the second signal quality, and the third signal quality, and the congestion control module 1508 may continue to compare the first signal quality, the second signal quality, and the third signal quality to each other, and determine the network congestion level based on the comparison.

In another aspect, the resource use deciding module 1510 decides by restricting use of the resource block to the first resources of the first region when the network congestion level is above the threshold. In yet another aspect, when the network congestion level is above the threshold, the resource use deciding module 1510 decides by lowering a preference to use the second resources of the second region and using the second resources of the second region based on the lowered preference.

The apparatus may include additional modules that perform each of the steps of the algorithm in the aforementioned flow charts of FIG. 12. As such, each step in the aforementioned flow charts of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
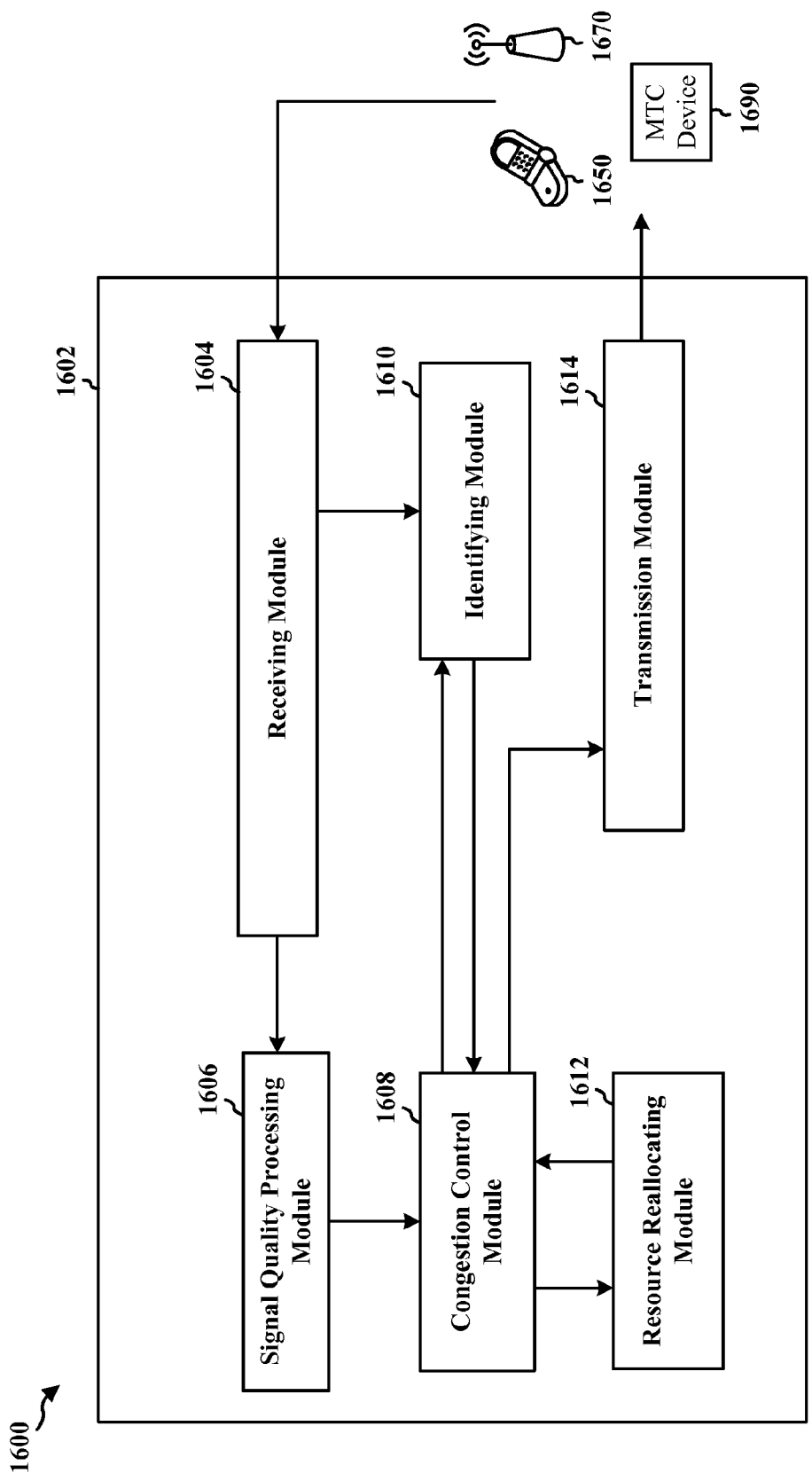
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602. The apparatus may be a UE communicating signals with another UE 1650, a base station 1670, and/or a MTC device 1690. The apparatus includes a receiving module 1604, a signal quality processing module 1606, a congestion control module 1608, an identifying module 1610, a resource reallocating module 1612, and a transmission module 1614.

The signal quality processing module 1606 may measure respective signal qualities (of signals received via the receiving module 1604) in at least two regions of a resource block (e.g., resource block 1102). Measuring the respective signal qualities may include measuring a first signal quality in a first region of the resource block, a second signal quality in a second region of the resource block, and a third signal quality in a third region of the resource block. In an aspect, the first region includes first resources allocated for at least one MTC device (e.g., MTC dedicated region 1104), the second region includes second resources allocated for the at least one MTC device and at least one UE (UE-MTC shared region 1106), and the third region includes third resources allocated for the at least one UE (UE dedicated region 1108). In an aspect, the first signal quality, the second signal quality, or the third signal quality may be a signal power, a signal-to-noise ratio, a number of discovered MTC devices or UEs, a number of resources being used, and/or a number of resources on which a UE or a MTC device can be discovered.

The congestion control module 1608 compares the respective signal qualities to each other. The congestion control module 1608 may also calculate a threshold related to a network congestion level based on the measured signal qualities. The congestion control module 1608 further determines a network congestion level based on the comparison.

The identifying module 1610 identifies at least one MTC device (e.g., MTC device 1690) or other UE (e.g., other UE 1650) to refrain from using resources respectively included in the at least two regions when the network congestion level is above the threshold. In an aspect, the identifying module 1610 identifies by identifying the at least one MTC device 1690 or other UE 1650 to refrain from using at least one of the first resources, the second resources, or the third resources when the network congestion level is above the threshold.

The resource reallocating module 1612 re-allocates the first resources, the second resources, and the third resources of the resource block based on the network congestion level. The re-allocating may include dividing the resource block into a re-allocated first region, a re-allocated second region, and a re-allocated third region. The re-allocated first region may include re-allocated first resources for the at least one MTC device (e.g., re-allocated MTC dedicated region 1110). The re-allocated second region may include re-allocated second resources for the at least one MTC device and the at least one UE (e.g., re-allocated UE-MTC shared region 1112). The re-allocated third region may include re-allocated third resources for the at least one UE (e.g., re-allocated UE dedicated region 1114).

The congestion control signal 1608 transmits (via the transmission module 1614) a congestion control signal to the at least one identified MTC device 1690 or other identified UE 1650 when the network congestion level is above the threshold. The congestion control signal may include a threshold for determining network congestion, the network congestion level, a requested amount of time to refrain from using the at least one of the first resources, the second resources, or the third resources, a MTC device identifier, a UE identifier, and/or resource allocation information.

The apparatus may include additional modules that perform each of the steps of the algorithm in the aforementioned flow chart of FIG. 13. As such, each step in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
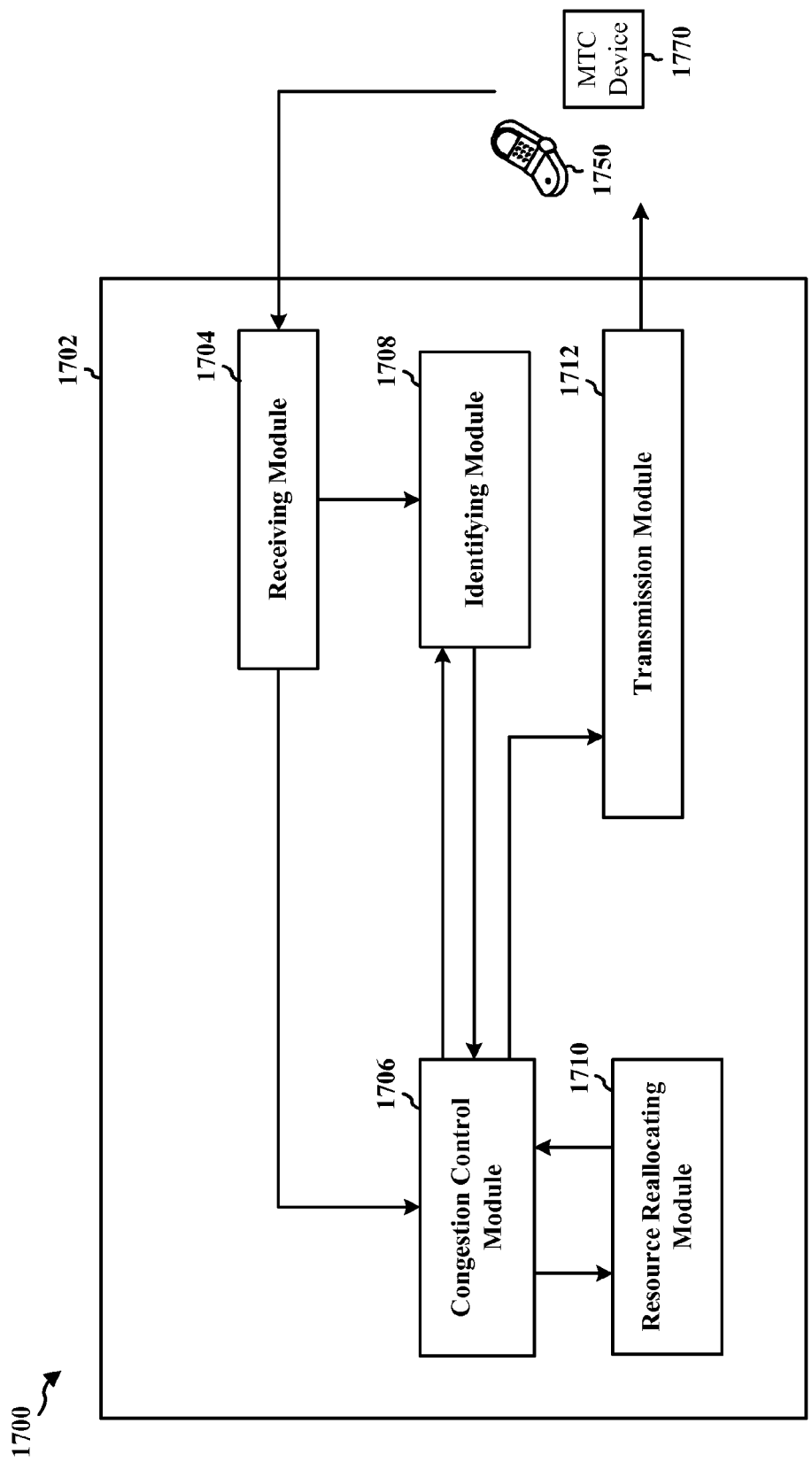
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be a base station (e.g., eNB). The apparatus includes a receiving module 1704, a congestion control module 1706, an identifying module 1710, a resource reallocating module 1710, and a transmission module 1712.

The congestion control module receives (via the receiving module 1704) at least one local congestion level respectively from at least one UE (e.g., 1750). The congestion control module 1706 determines a network congestion level based on the at least one local congestion level.

Based on the at least one local congestion level or the network congestion level, the apparatus 1702 may perform one or more actions. For example, the resource reallocating module 1710 may allocate resources of a resource block (e.g., resource block 1102) into a first region, a second region, and a third region, wherein the first region includes first resources allocated for at least one MTC device (e.g., MTC dedicated region 1104), the second region includes second resources allocated for the at least one MTC device and the at least one UE (e.g., UE-MTC shared region 1106), and the third region includes third resources allocated for the at least one UE (e.g., UE dedicated region 1108). In another example, the resource reallocating module 1710 and/or the congestion control module 1706 may determine a reshuffle threshold for the at least one UE 1750. In a further example, the identifying module 1708 may identify at least one MTC device (e.g., MTC device 1770) or UE 1750 to refrain from using at least one of the first resources, the second resources, or the third resources.

The congestion control module 1706 transmits (via the transmission module) a congestion control signal to the at least one UE 1750 and/or the at least one MTC device 1770 based on the network congestion level. The congestion control signal may include a threshold for determining network congestion, the at least one local congestion level, the network congestion level, the resource allocation of the resource block, the reshuffle threshold for the at least one UE, a requested amount of time to refrain from using the at least one of the first resources, the second resources, or the third resources, a MTC device identifier, and/or a UE identifier.

The apparatus may include additional modules that perform each of the steps of the algorithm in the aforementioned flow charts of FIG. 14. As such, each step in the aforementioned flow charts of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
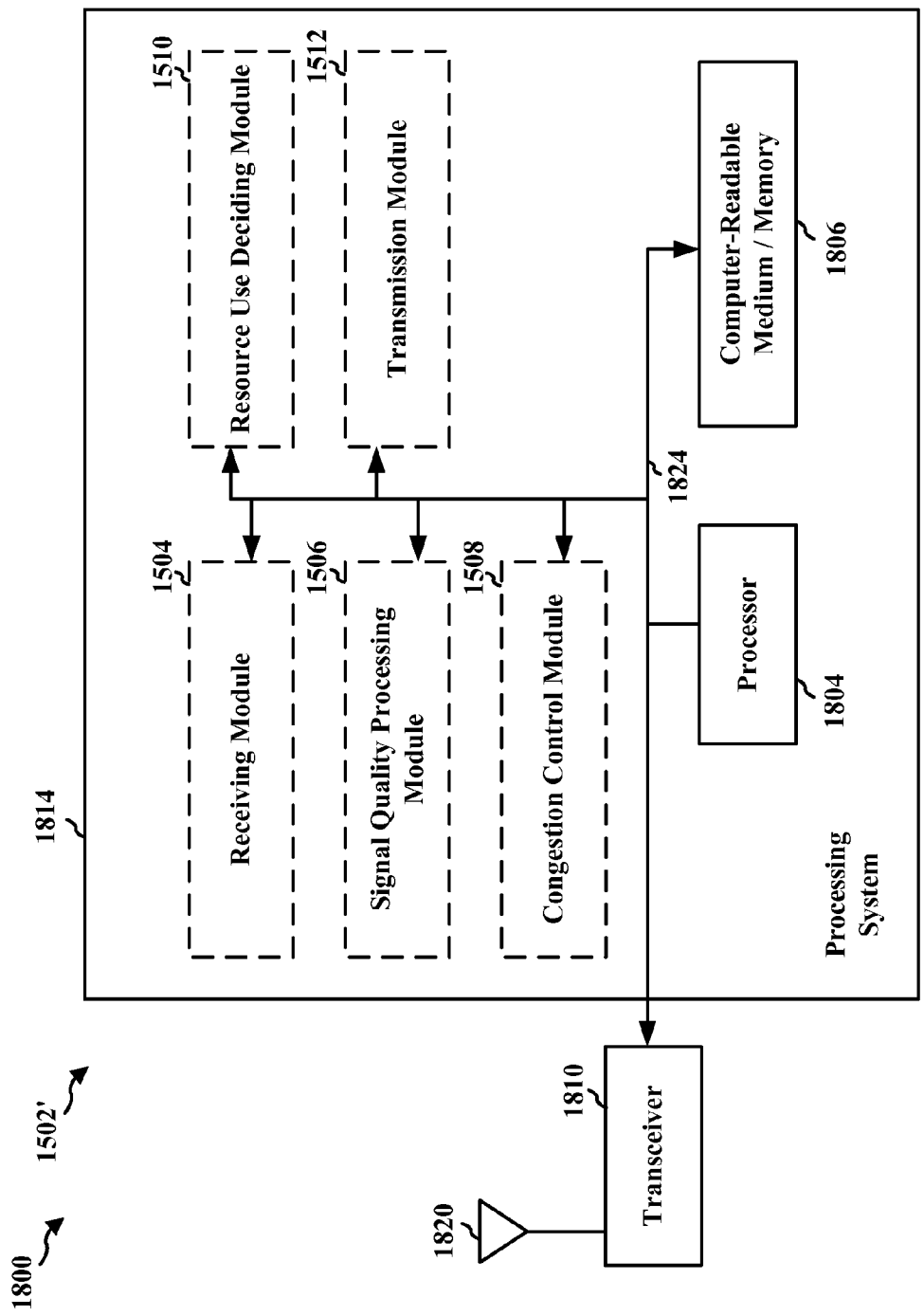
FIG. 18 is a diagram illustrating an example of a hardware implementation for an apparatus employing a processing system.

FIG. 18 is a diagram 1800 illustrating an example of a hardware implementation for an apparatus 1502' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1504, 1506, 1508, 1510, 1512, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the receiving module 1504. In addition, the transceiver 1810 receives information from the processing system 1814, specifically the transmission module 1512, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system further includes at least one of the modules 1504, 1506, 1508, 1510, and 1512. The modules may be software modules running in the processor 1804, resident/stored in the computer readable medium/memory 1806, one or more hardware modules coupled to the processor 1804, or some combination thereof. The processing system 1814 may be a component of the UE/MTC device 650 and may include the memory 660 and/or at least one of the TX processor 668, the RX processor 656, and the controller/processor 659.

In one configuration, the apparatus 1502/1502' for wireless communication includes means for measuring respective signal qualities in at least two regions of a resource block, means for comparing the respective signal qualities to each other, means for calculating a threshold based on the measured signal qualities, means for determining a network congestion level based on the comparison, and means for deciding whether to use resources respectively included in the at least two regions based on the network congestion level.

The aforementioned means may be one or more of the aforementioned modules of the apparatus 1502 and/or the processing system 1814 of the apparatus 1502' configured to perform the functions recited by the aforementioned means. As described supra, the processing system 1814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 19:
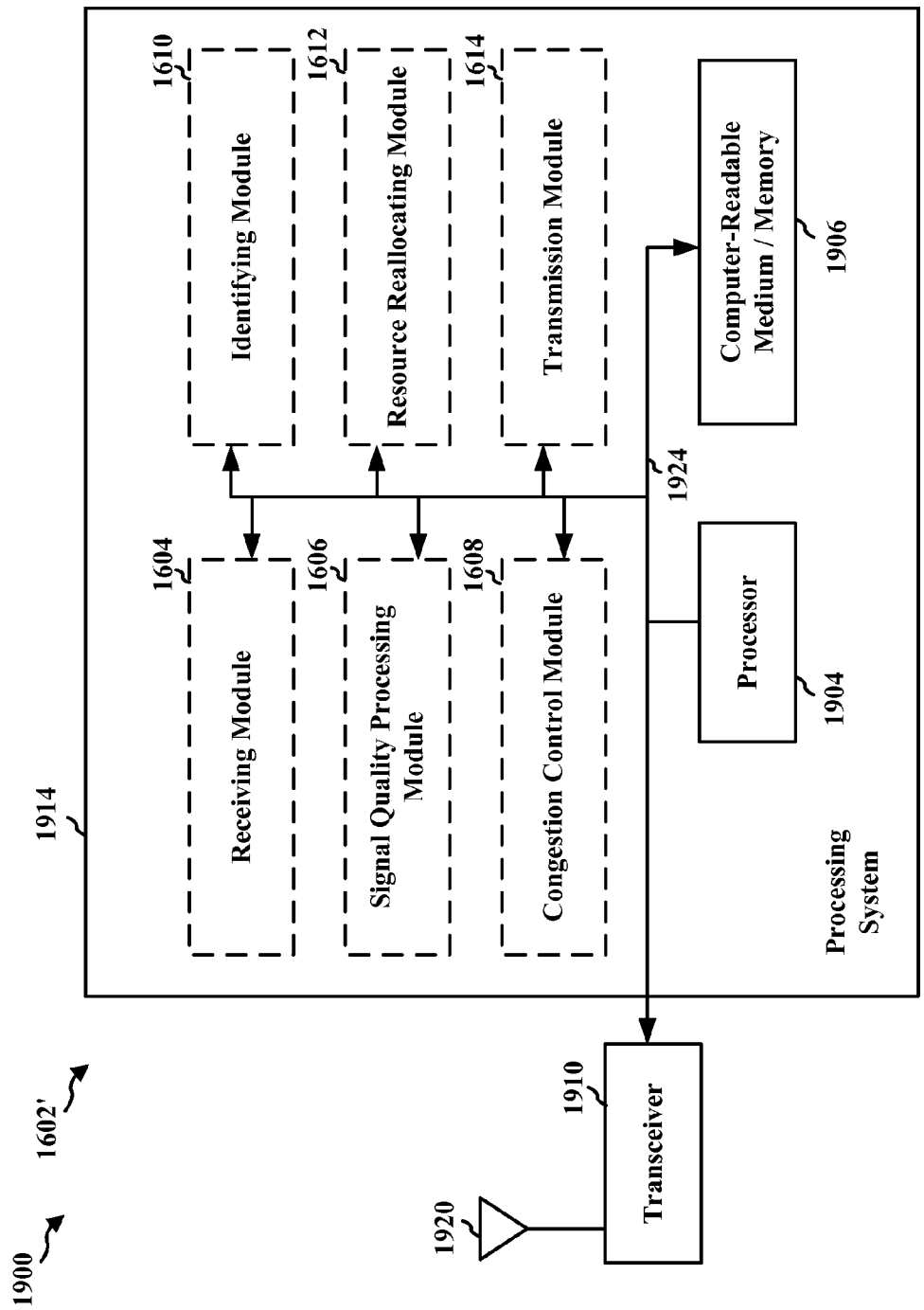
FIG. 19 is a diagram illustrating an example of a hardware implementation for an apparatus employing a processing system.

FIG. 19 is a diagram 1900 illustrating an example of a hardware implementation for an apparatus 1602' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1604, 1606, 1608, 1610, 1612, 1614, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the receiving module 1604. In addition, the transceiver 1910 receives information from the processing system 1914, specifically the transmission module 1614, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system further includes at least one of the modules 1604, 1606, 1608, 1610, 1612, and 1614. The modules may be software modules running in the processor 1904, resident/stored in the computer readable medium/memory 1906, one or more hardware modules coupled to the processor 1904, or some combination thereof. The processing system 1914 may be a component of the UE 650 and may include the memory 660 and/or at least one of the TX processor 668, the RX processor 656, and the controller/processor 659.

In one configuration, the apparatus 1602/1602' for wireless communication includes means for measuring respective signal qualities in at least two regions of a resource block, means for comparing the respective signal qualities to each other, means for determining a network congestion level based on the comparison, means for calculating a threshold based on the measured signal qualities, means for identifying at least one machine type communication (MTC) device or other UE to refrain from using resources respectively included in the at least two regions when the network congestion level is above a threshold, means for transmitting a congestion control signal to the at least one identified MTC device or other identified UE when the network congestion level is above the threshold, and means for re-allocating the first resources, the second resources, and the third resources of the resource block based on the network congestion level.

The aforementioned means may be one or more of the aforementioned modules of the apparatus 1602 and/or the processing system 1914 of the apparatus 1602' configured to perform the functions recited by the aforementioned means. As described supra, the processing system 1914 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 20:
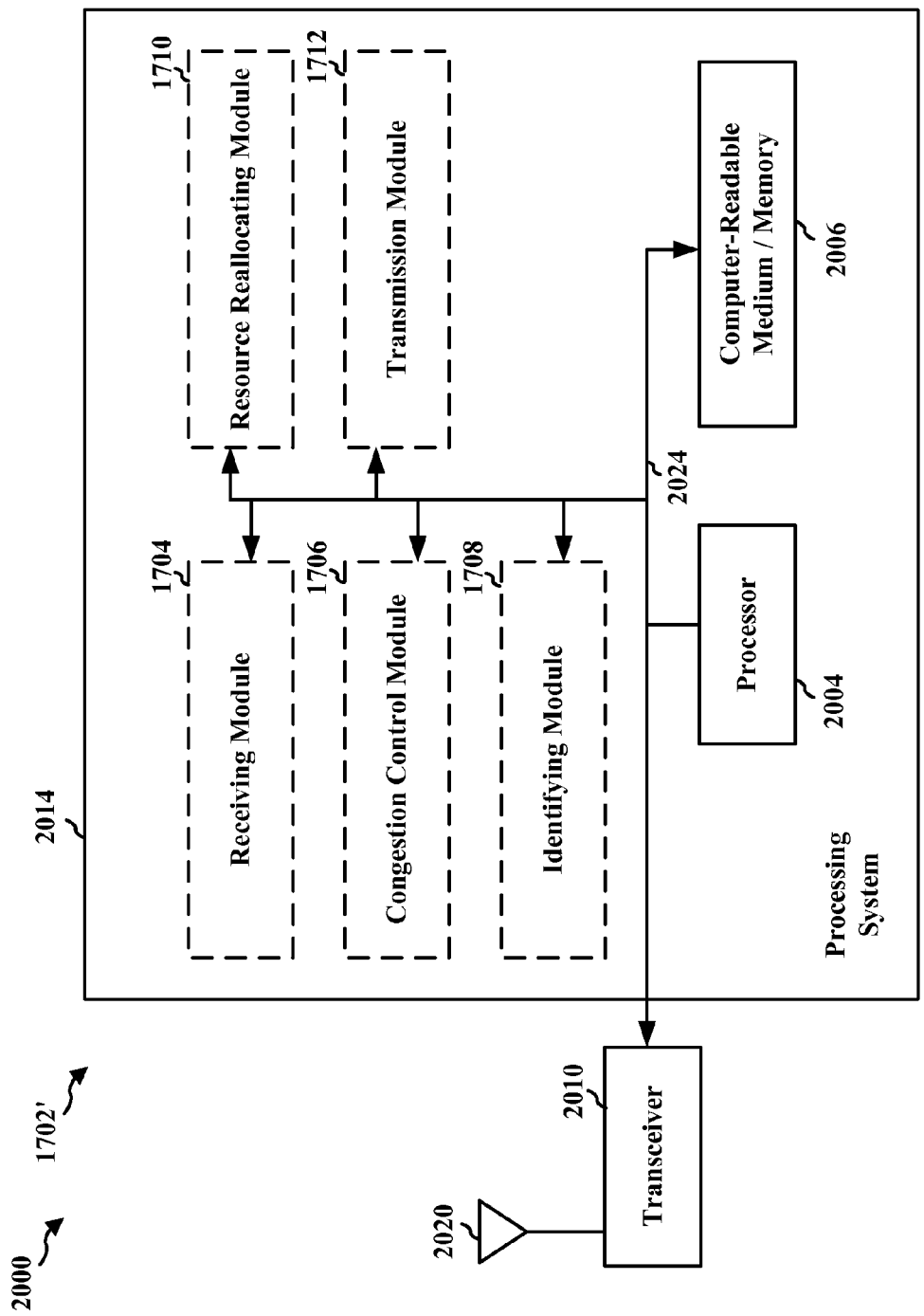
FIG. 20 is a diagram illustrating an example of a hardware implementation for an apparatus employing a processing system.

FIG. 20 is a diagram 2000 illustrating an example of a hardware implementation for an apparatus 1702' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1704, 1706, 1708, 1710, 1712 and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the receiving module 1704. In addition, the transceiver 2010 receives information from the processing system 2014, specifically the transmission module 1712, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system further includes at least one of the modules 1704, 1706, 1708, 1710, and 1712. The modules may be software modules running in the processor 2004, resident/stored in the computer readable medium/memory 2006, one or more hardware modules coupled to the processor 2004, or some combination thereof. The processing system 2014 may be a component of the eNB 610 and may include the memory 676 and/or at least one of the TX processor 616, the RX processor 670, and the controller/processor 675.

In one configuration, the apparatus 1702/1702' for wireless communication includes means for receiving at least one local congestion level respectively from at least one user equipment (UE), means for determining a network congestion level based on the at least one local congestion level, means for transmitting a congestion control signal to at least one of the at least one UE or at least one machine type communication (MTC) device based on the network congestion level, means for allocating resources of a resource block into a first region, a second region, and a third region, wherein the first region comprises first resources allocated for at least one MTC device, the second region comprises second resources allocated for the at least one MTC device and the at least one UE, and the third region comprises third resources allocated for the at least one UE, means for determining a reshuffle threshold for the at least one UE, and means for identifying at least one MTC device or UE to refrain from using at least one of the first resources, the second resources, or the third resources.

The aforementioned means may be one or more of the aforementioned modules of the apparatus 1702 and/or the processing system 2014 of the apparatus 1702' configured to perform the functions recited by the aforementioned means. As described supra, the processing system 1714 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of congestion control at a machine type communication (MTC) device, comprising:
   measuring respective signal qualities in at least two regions of at least one resource block of a subframe, the at least two regions including a first region and a second region, the first region and the second region each including a different one of MTC-dedicated resources, MTC-user equipment (UE) shared resources, or UE-dedicated resources;
   comparing the respective signal qualities to each other by comparing a first signal quality associated with the first region including one of the MTC-dedicated resources, MTC-UE shared resources, or UE-dedicated resources with a second signal quality associated with the second region including a different one of the MTC-dedicated resources, MTC-UE shared resources, or UE-dedicated resources;
   determining a network congestion level based on the comparison; and
   deciding whether to use resources respectively included in the at least two regions based on the network congestion level.

2. The method of claim 1, wherein:
   the measuring the respective signal qualities further comprises measuring a third signal quality in a third region of the at least one resource block,
   the first region comprises the MTC-dedicated resources allocated for at least one MTC device, the second region comprises the MTC-UE shared resources allocated for the at least one MTC device and at least one user equipment (UE), and the third region comprises UE-dedicated resources allocated for the at least one UE; and
   the deciding comprises deciding whether to use at least one of the MTC-dedicated resources of the first region or the MTC-UE shared resources of the second region based on the network congestion level.

3. The method of claim 2, wherein the deciding comprises:
   refraining from using at least one of the MTC-dedicated resources of the first region or the MTC-UE shared resources of the second region for a period of time when the network congestion level is above a threshold.

4. The method of claim 3, further comprising:
   calculating the threshold based on the measured signal qualities.

5. The method of claim 3, further comprising during the period of time:
   activating a sleep mode; or
   continuing to:
      measure the first signal quality, the second signal quality, and the third signal quality,
      compare the first signal quality, the second signal quality, and the third signal quality to each other, and
      determine the network congestion level based on the comparison.

6. The method of claim 2, wherein the first signal quality, the second signal quality, or the third signal quality comprises at least one of:
   a signal power;
   a signal-to-noise ratio;
   a number of discovered MTC devices or UEs;
   a number of resources being used; or
   a number of resources on which a UE or a MTC device can be discovered.

7. The method of claim 2, wherein the deciding further comprises:
   restricting use of the at least one resource block to the MTC-dedicated resources of the first region when the network congestion level is above a threshold.

8. The method of claim 2, wherein when the network congestion level is above a threshold, the deciding further comprises:
   lowering a preference to use the MTC-UE shared resources of the second region; and
   using the MTC-UE shared resources of the second region based on the lowered preference.

9. A method of congestion control at a user equipment (UE), comprising:
   measuring respective signal qualities in at least two regions of at least one resource block of a subframe;
   comparing the respective signal qualities to each other;
   determining a network congestion level based on the comparison;
   identifying at least one machine type communication (MTC) device or other UE to refrain from using resources respectively included in the at least two regions when the network congestion level is above a threshold; and
   transmitting a congestion control signal to the at least one identified MTC device or other identified UE when the network congestion level is above the threshold.

10. The method of claim 9, wherein:
    the measuring the respective signal qualities comprises measuring a first signal quality in a first region of the at least one resource block, a second signal quality in a second region of the at least one resource block, and a third signal quality in a third region of the at least one resource block,
    the first region comprises first resources allocated for at least one MTC device, the second region comprises second resources allocated for the at least one MTC device and at least one UE, and the third region comprises third resources allocated for the at least one UE; and
    the identifying comprises identifying the at least one MTC device or the other UE to refrain from using at least one of the first resources, the second resources, or the third resources when the network congestion level is above the threshold.

11. The method of claim 10, further comprising:
    calculating the threshold based on the measured signal qualities.

12. The method of claim 10, wherein the first signal quality, the second signal quality, or the third signal quality comprises at least one of:
    a signal power;
    a signal-to-noise ratio;
    a number of discovered MTC devices or UEs;
    a number of resources being used; or
    a number of resources on which a UE or a MTC device can be discovered.

13. The method of claim 10, wherein the congestion control signal comprises at least one of:
a threshold for determining network congestion;
the network congestion level;
a requested amount of time to refrain from using the at least one of the first resources, the second resources, or the third resources;
a MTC device identifier;
a UE identifier; or
resource allocation information.

14. The method of claim 10, further comprising:
re-allocating the first resources, the second resources, and the third resources of the at least one resource block based on the network congestion level, the re-allocating comprising:
dividing the at least one resource block into a re-allocated first region, a re-allocated second region, and a re-allocated third region, wherein:
the re-allocated first region comprises re-allocated first resources for the at least one MTC device,
the re-allocated second region comprises re-allocated second resources for the at least one MTC device and the at least one UE, and
the re-allocated third region comprises re-allocated third resources for the at least one UE.

15. A method of congestion control at a base station, comprising:
receiving at least one local congestion level from at least one user equipment (UE);
determining a network congestion level based on the at least one local congestion level;
allocating resources of at least one resource block of a subframe into a first region, a second region, and a third region, wherein the first region comprises first resources allocated for at least one machine type communication (MTC) device, the second region comprises second resources allocated for the at least one MTC device and the at least one UE, the third region comprises third resources allocated for the at least one UE; and
transmitting a congestion control signal to at least one of the at least one UE or at least one machine type communication (MTC) device based on the network congestion level.

16. The method of claim 15, further comprising at least one of:
determining a reshuffle threshold for the at least one UE, or
identifying at least one MTC device or UE to refrain from using at least one of the first resources, the second resources, or the third resources.

17. The method of claim 16, wherein the congestion control signal comprises at least one of:
a threshold for determining network congestion;
the at least one local congestion level;
the network congestion level;
the resource allocation of the at least one resource block;
the reshuffle threshold for the at least one UE;
a requested amount of time to refrain from using the at least one of the first resources, the second resources, or the third resources;
a MTC device identifier; or
a UE identifier.

18. A user equipment (UE) for congestion control, comprising:
means for measuring respective signal qualities in at least two regions of at least one resource block of a subframe;
means for comparing the respective signal qualities to each other;
means for determining a network congestion level based on the comparison;
means for identifying at least one machine type communication (MTC) device or other UE to refrain from using resources respectively included in the at least two regions when the network congestion level is above a threshold; and
means for transmitting a congestion control signal to the at least one identified MTC device or other identified UE when the network congestion level is above the threshold.

19. The UE of claim 18, wherein:
the means for measuring the respective signal qualities is configured to measure a first signal quality in a first region of the at least one resource block, a second signal quality in a second region of the at least one resource block, and a third signal quality in a third region of the at least one resource block,
the first region comprises first resources allocated for at least one MTC device, the second region comprises second resources allocated for the at least one MTC device and at least one UE, and the third region comprises third resources allocated for the at least one UE; and
the means for identifying is configured to identify the at least one MTC device or the other UE to refrain from using at least one of the first resources, the second resources, or the third resources when the network congestion level is above the threshold.

20. The UE of claim 19, further comprising:
means for calculating the threshold based on the measured signal qualities.

21. The UE of claim 19, wherein the first signal quality, the second signal quality, or the third signal quality comprises at least one of:
a signal power;
a signal-to-noise ratio;
a number of discovered MTC devices or UEs;
a number of resources being used; or
a number of resources on which a UE or a MTC device can be discovered.

22. The UE of claim 19, wherein the congestion control signal comprises at least one of:
a threshold for determining network congestion;
the network congestion level;
a requested amount of time to refrain from using the at least one of the first resources, the second resources, or the third resources;
a MTC device identifier;
a UE identifier; or
resource allocation information.

23. The UE of claim 19, further comprising:
means for re-allocating the first resources, the second resources, and the third resources of the at least one resource block based on the network congestion level, wherein the means for re-allocating is configured to:
divide the at least one resource block into a re-allocated first region, a re-allocated second region, and a re-allocated third region, wherein:
the re-allocated first region comprises re-allocated first resources for the at least one MTC device, the re-allocated second region comprises re-allocated second resources for the at least one MTC device and the at least one UE, and the re-allocated third region comprises re-allocated third resources for the at least one UE.

24. The method of claim 1, wherein the at least one resource block is associated with peer discovery for the MTC device.

25. The method of claim 9, wherein the at least one resource block is associated with peer discovery for the UE.

26. The UE of claim 18, wherein the at least one resource block is associated with peer discovery for the UE.

* * * * *